US012664222B2

(12) United States Patent
Hardy

(10) Patent No.: US 12,664,222 B2
(45) Date of Patent: Jun. 23, 2026

(54) METHODS AND SYSTEMS FOR PRIORITIZING DIGITAL MEDIA CONTENT WITHIN A DIGITAL MEDIA CONTENT GALLERY

(71) Applicant: Videomentum, Inc., Washington, DC (US)

(72) Inventor: Brian Hardy, Durham, NC (US)

( * ) Notice: Subject to any disclaimer, the term of this patent is extended or adjusted under 35 U.S.C. 154(b) by 178 days.

(21) Appl. No.: 18/224,963

(22) Filed: Jul. 21, 2023

(65) Prior Publication Data

US 2023/0394093 A1     Dec. 7, 2023

Related U.S. Application Data

(63) Continuation-in-part of application No. 17/831,708, filed on Jun. 3, 2022, now Pat. No. 12,093,350.

(60) Provisional application No. 63/348,403, filed on Jun. 2, 2022.

(51) Int. Cl.
*G06F 16/9532* (2019.01)
*G06F 16/9535* (2019.01)
*G06F 40/247* (2020.01)

(52) U.S. Cl.
CPC ...... *G06F 16/9532* (2019.01); *G06F 16/9535* (2019.01); *G06F 40/247* (2020.01)

(58) Field of Classification Search
None
See application file for complete search history.

(56) References Cited

U.S. PATENT DOCUMENTS

| | | | | |
|---|---|---|---|---|
| 2012/0102112 A1* | 4/2012 | Junginger | .............. | G06F 16/00 |
| | | | | 709/204 |
| 2013/0204664 A1* | 8/2013 | Romagnolo | ....... | G06Q 30/0203 |
| | | | | 705/7.32 |
| 2018/0144052 A1* | 5/2018 | Sayyadi-Harikandehei | ................ | |
| | | | | G06F 16/40 |
| 2020/0226481 A1* | 7/2020 | Sim | ..................... | G06F 16/9535 |

* cited by examiner

*Primary Examiner* — Kannan Shanmugasundaram
(74) *Attorney, Agent, or Firm* — John Paul Lawrence

(57) ABSTRACT

One variation of a method for prioritizing content pieces within a content gallery comprises: providing a content gallery comprising a plurality of content pieces to a plurality of users, wherein each content piece from the plurality of content pieces is associated with one or more tags and one or more respective tag scores associated with the one or more tags; receiving, through a graphical user interface (GUI) of the content gallery, a search term related to a first tag; retrieving at least a first content piece and a second content piece associated with the first tag from the plurality of content pieces; and displaying, within the GUI of the content gallery, the first and second content pieces within a list of search results, wherein the first and second content pieces are prioritized in descending order of tag score associated with the first tag.

20 Claims, 18 Drawing Sheets

544

METHODS AND SYSTEMS FOR PRIORITIZING DIGITAL MEDIA CONTENT WITHIN A DIGITAL MEDIA CONTENT GALLERY

CROSS-REFERENCE

This application is a continuation-in-part of U.S. Non-Provisional application Ser. No. 17/831,708, filed Jun. 3, 2022, which claims the benefit of U.S. Provisional Application No. 63/348,403, filed Jun. 2, 2022, both of which are hereby incorporated herein by reference in their entirety.

TECHNICAL FIELD

This application relates generally to the field of digital media distribution. More specifically, the application discloses new and useful systems for prioritizing, or managing the prioritization of, digital media content within a digital media content gallery.

BACKGROUND

A digital media content gallery (hereinafter, a "content gallery") is a digital space (e.g., a website or an application) with a graphical user interface (GUI) through which visitors of the content gallery can access one or more digital media content pieces (e.g., image files, video files, audio files, text files, etc.; also referred to as "content pieces" or "digital media assets"). For example, YouTube, Instagram, Spotify, and the New York Times website are all content galleries. Individual content galleries often focus on different types of digital media content (e.g., YouTube focuses on videos, Instagram focuses on images, Spotify focuses on audio, and the New York Times focuses on text) or cater to different audiences, but, in general, a content gallery strives to encourage its visitors to remain on, or return to, the content gallery, and consume additional content pieces provided by the content gallery. Often, to meet this goal, a content gallery attempts to present a visitor with content pieces that the content gallery (or a curator of the content gallery) believes will be the most compelling content pieces to the visitor. Content galleries often do so by employing rating systems or algorithms to recommend to a visitor a highly rated content piece or a content piece similar to another content piece that the visitor has previously viewed. However, rating systems can be vulnerable to unmitigated subjectivity, and algorithms often fail to recommend compelling content.

SUMMARY

In various embodiments, disclosed herein are methods and systems for prioritizing, or managing the prioritization of, digital media content pieces within a digital media content gallery. In some embodiments, a content piece provided by a content gallery is associated with a content score (e.g., a rating) that represents how well the content piece has been received by visitors (e.g., users) of the content gallery who have accessed or consumed the content piece. In some embodiments, two or more content pieces provided by a content gallery are displayed within a list or group of content pieces within a graphical user interface of the content gallery, and the two or more content pieces are prioritized within the list or group of content pieces in descending order of content score. In some embodiments, users of the content gallery can manipulate the content score associated with a content piece by making a positive vote on the content piece (e.g., up voting) to express satisfaction with the content piece, or by making a negative vote on the content piece (e.g., down voting) to express dissatisfaction with the content piece. In some embodiments, a user of the content gallery is associated with a voter score, and the change (e.g., the magnitude of an increase or a decrease) applied to a content score associated with a content piece in response to a vote made by the user on the content piece depends at least in part on the voter score associated with the user. In some embodiments, one or more content pieces provided by a content gallery are identified as central pieces (e.g., content pieces of particular importance to the content gallery), and a voter score associated with a user of the content gallery is based at least in part on positive votes or negative votes made by the user on the one or more content pieces identified as central pieces. In some embodiments, if a voter score associated with a user is below a threshold voter score, the user is identified as an antagonistic user. In some embodiments, a comment made on a content piece by an antagonistic user may only be seen by other antagonistic users. In some embodiments, a content piece provided by a content gallery is associated with a tag and a tag score associated with the tag. In some embodiments, users of the content gallery can manipulate a tag score associated with a tag and a content piece by making a positive vote on the tag to express satisfaction with the tag's association with the content piece, or by making a negative vote on the tag to express dissatisfaction with the tag's association with the content piece. In some embodiments, the change (e.g., the magnitude of an increase or decrease) applied to a tag score associated with a tag and a content piece in response to a vote made by a user on the tag depends at least in part on a voter score associated with the user. In some embodiments, two or more content pieces provided by a content gallery and associated with a tag can be categorized by the tag and displayed within a group or list of content pieces associated with the tag within a graphical user interface of the content gallery. In some embodiments, two or more content pieces displayed within a group or list of content pieces associated with a tag are prioritized in descending order of tag score.

In one aspect, a method for autonomously moderating an online community comprises: a) accessing a content gallery comprising a plurality of content pieces and provided to a plurality of users; b) identifying a subset of antagonistic users of the content gallery from the plurality of users; c) receiving a comment, on a content piece from the plurality of content pieces, from an antagonistic user from the subset of antagonistic users; d) allowing the subset of antagonistic users to view the comment on the content piece; and e) hiding the comment on the content piece from users from the plurality of users not identified as antagonistic users. In some embodiments, each user from the plurality of users is associated with a voter score, and identifying the subset of antagonistic users of the content gallery comprises identifying users from the plurality of users associated with voting scores below a threshold voter score as antagonistic users. In some embodiments, the threshold voter score is determined by a curator of the content gallery. In some embodiments, the voter score associated with a user from the plurality of users is determined based at least in part on positive votes or negative votes made by the user on one or more content pieces from the plurality of content pieces identified as central pieces of the content gallery. In some embodiments, a positive vote made by the user on a central piece increases the voter score associated with the user, and a negative vote made by the user on a central piece decreases the voter score associated with the user. In some embodiments, the plurality of content pieces identified as central pieces of the content gallery are identified as central pieces of the content gallery by a curator of the content gallery. In some embodiments, the method further comprises providing the content gallery to the plurality of users. In some embodiments, each content piece from the plurality of content pieces is associated with a content score, and the content score is determined based at least in part on positive votes or negative votes made by users from the plurality of users on the content piece. In some embodiments, a positive vote made by a user on a content piece increases a content score associated with the content piece, and a negative vote made by a user on the content piece decreases the content score associated with the content piece. In some embodiments, a negative vote made by an antagonistic user on a content piece decreases a content score associated with the content piece less than a negative vote made on the content piece by a user not identified as an antagonistic user. In some embodiments, the method further comprises displaying two or more content pieces from the plurality of content pieces within a list of content pieces, wherein the two or more content pieces are prioritized in descending order of content score.

In another aspect, a system for autonomously moderating an online community comprises a network component, a memory, and at least one processor operative to: a) access a content gallery comprising a plurality of content pieces and provided to a plurality of users; b) identify a subset of antagonistic users of the content gallery from the plurality of users; c) receive a comment, on a content piece from the plurality of content pieces, from an antagonistic user from the subset of antagonistic users; d) allow the subset of antagonistic users to view the comment on the content piece; and e) hide the comment on the content piece from users from the plurality of users not identified as antagonistic users.

In another aspect, a method for prioritizing content pieces within a content gallery comprises: a) providing a content gallery comprising a plurality of content pieces to a plurality of users, wherein each content piece from the plurality of content pieces is associated with one or more tags and one or more tag scores associated with the one or more tags; b) receiving, through a graphical user interface (GUI) of the content gallery, a search term related to a first tag; c) retrieving at least a first content piece and a second content piece associated with the first tag from the plurality of content pieces; and d) displaying, within the GUI of the content gallery, the first and second content pieces within a list of search results, wherein the first and second content pieces are prioritized in descending order of tag score associated with the first tag. In some embodiments, the first tag is associated with the first and second content pieces by a curator of the content gallery. In some embodiments, the search term is included in a list of synonyms of the first tag. In some embodiments, the list of synonyms of the first tag is established by the curator of the content gallery. In some embodiments, a first tag score associated with the first tag and the first content piece is greater than a second tag score associated with the first tag and the second content piece, and prioritizing the first and second content pieces in descending order of tag score associated with the first tag comprises listing the first content piece before the second content piece. In some embodiments, a first tag score associated with the first tag and the first content piece is greater than a second tag score associated with the first tag and the second content piece, and prioritizing the first and second content pieces in descending order of tag score associated with the first tag comprises emphasizing a visual characteristic of the first content piece. In some embodiments, the tag scores associated with the first tag and the first and second content pieces are generated based at least in part on positive and negative votes made by a plurality of users of the content gallery on the first tag associated with the first and second content pieces from within the GUI of the content gallery. In some embodiments, the method further comprises increasing a tag score associated with a tag and a content piece from the plurality of content pieces in response to detecting a positive vote made by a user on the tag and decreasing the tag score associated with the tag and the content piece in response to detecting a negative vote made by a user on the tag. In some embodiments, each user from the plurality of users is associated with a voter score, and the method further comprises: a) detecting, through the GUI, a first positive vote made by a first user from the plurality of users on the first tag associated with the first content piece, wherein the first user is associated with a first voter score; b) in response to detecting the first positive vote, increasing the tag score associated with the first tag and the first content piece; c) detecting, through the GUI, a second positive vote made by a second user from the plurality of users on the first tag associated with the first content piece, wherein the second user is associated with a second voter score that is less than the first voter score; and d) in response to detecting the second positive vote, increasing the tag score associated with the first tag and the first content piece, wherein the increase to the tag score in response to detecting the first positive vote is greater than the increase to the tag score in response to detecting the second positive vote. In some embodiments, the method further comprises: a) identifying a subset of antagonistic users of the content gallery from the plurality of users of the content gallery; b) detecting a negative vote made by an antagonistic user from the subset of antagonistic users on the first tag associated with the first content piece; and c) disregarding the negative vote made by the antagonistic user on the first tag associated with the first content piece. In some embodiments, identifying the subset of antagonistic users of the content gallery comprises identifying users from the plurality of users associated with voting scores below a threshold voter score as antagonistic users. In some embodiments, the threshold voter score is determined by a curator of the content gallery.

In another aspect, a system for prioritizing content pieces within a content gallery comprises a network component, a memory, and at least one processor operative to: a) provide a content gallery comprising a plurality of content pieces to a plurality of users, wherein each content piece from the plurality of content pieces is associated with one or more tags and one or more tag scores associated with the one or more tags; b) receive, through a graphical user interface (GUI) of the content gallery, a search term related to a first tag; c) retrieve at least a first content piece and a second content piece associated with the first tag from the plurality of content pieces; and d) display, within the GUI of the content gallery, the first and second content pieces within a list of search results, wherein the first and second content pieces are prioritized in descending order of tag score associated with the first tag.

BRIEF DESCRIPTION OF THE DRAWINGS

The novel features of the invention are set forth with particularity in the appended claims. A better understanding of the features and advantages of the present invention will be obtained by reference to the following detailed descrip-

Figure 1:
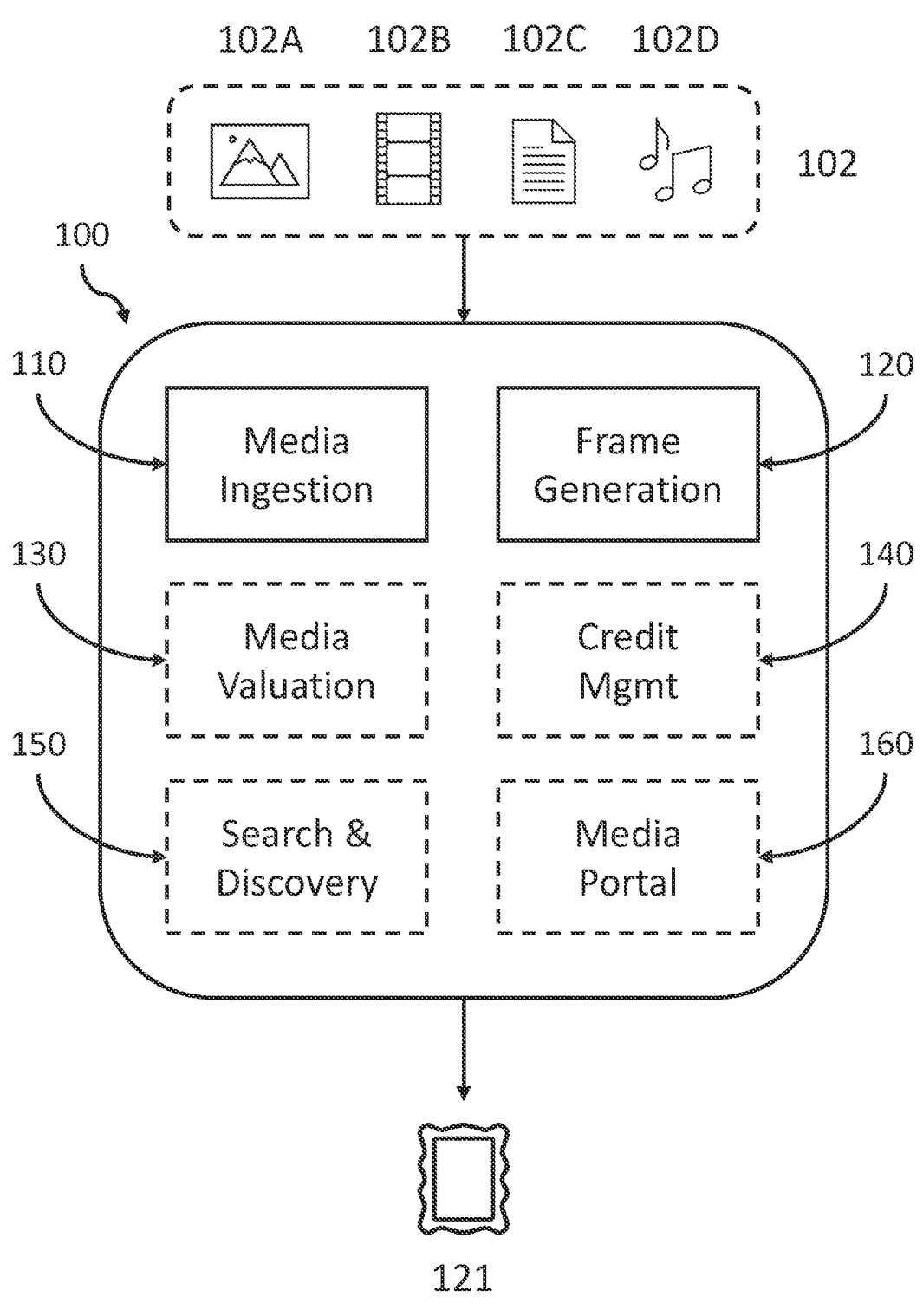
Figure 2:
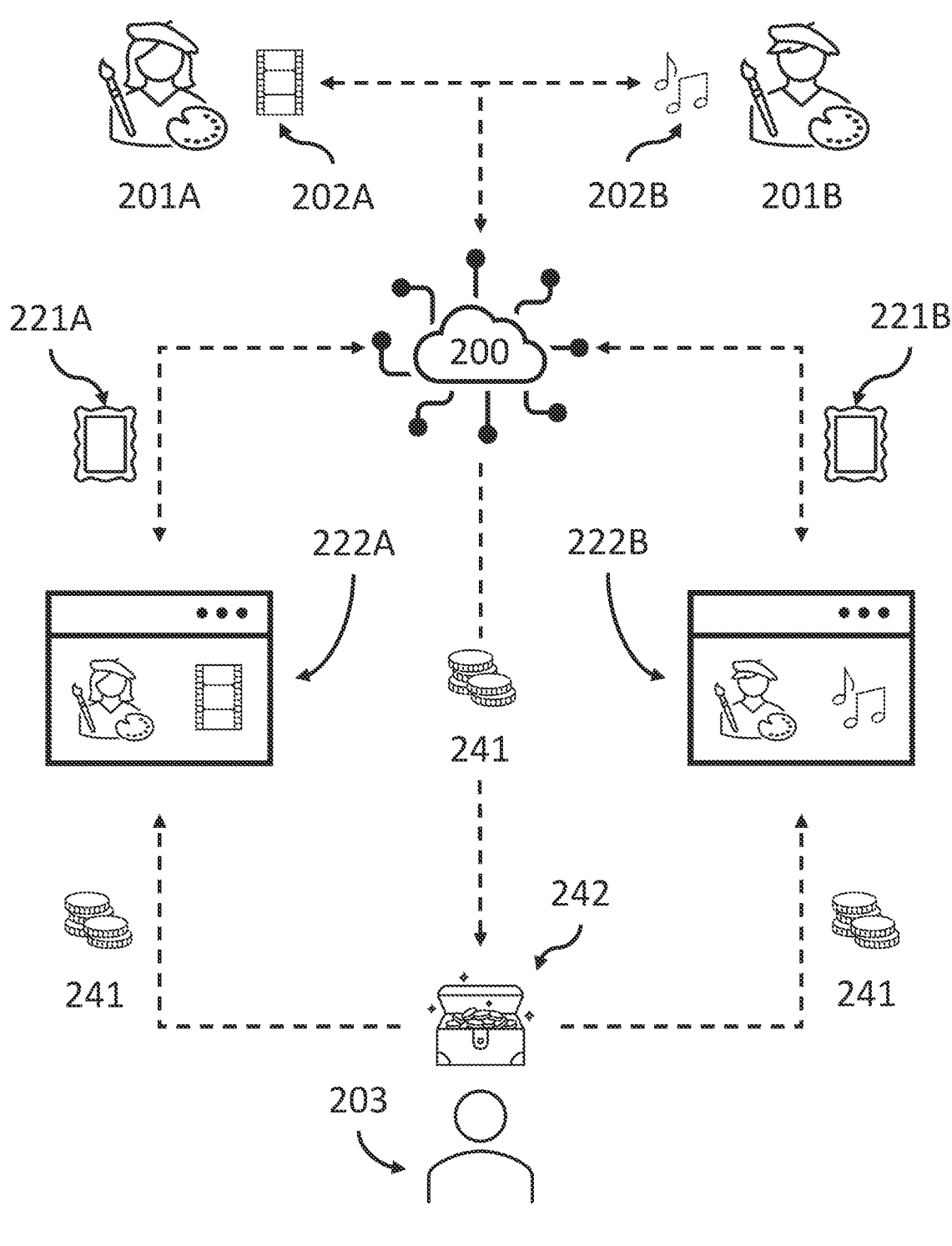
Figure 3A:
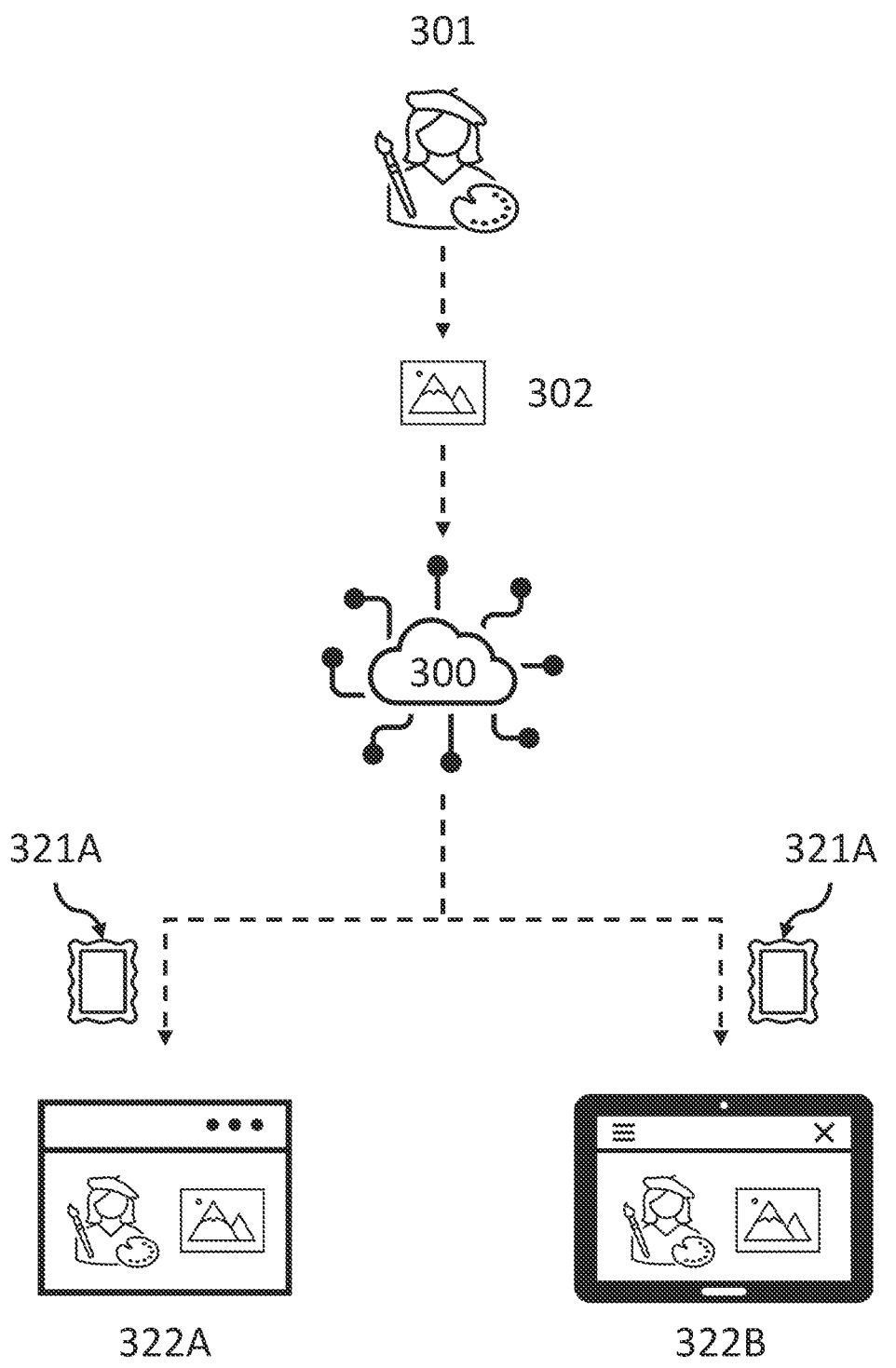
Figure 3B:
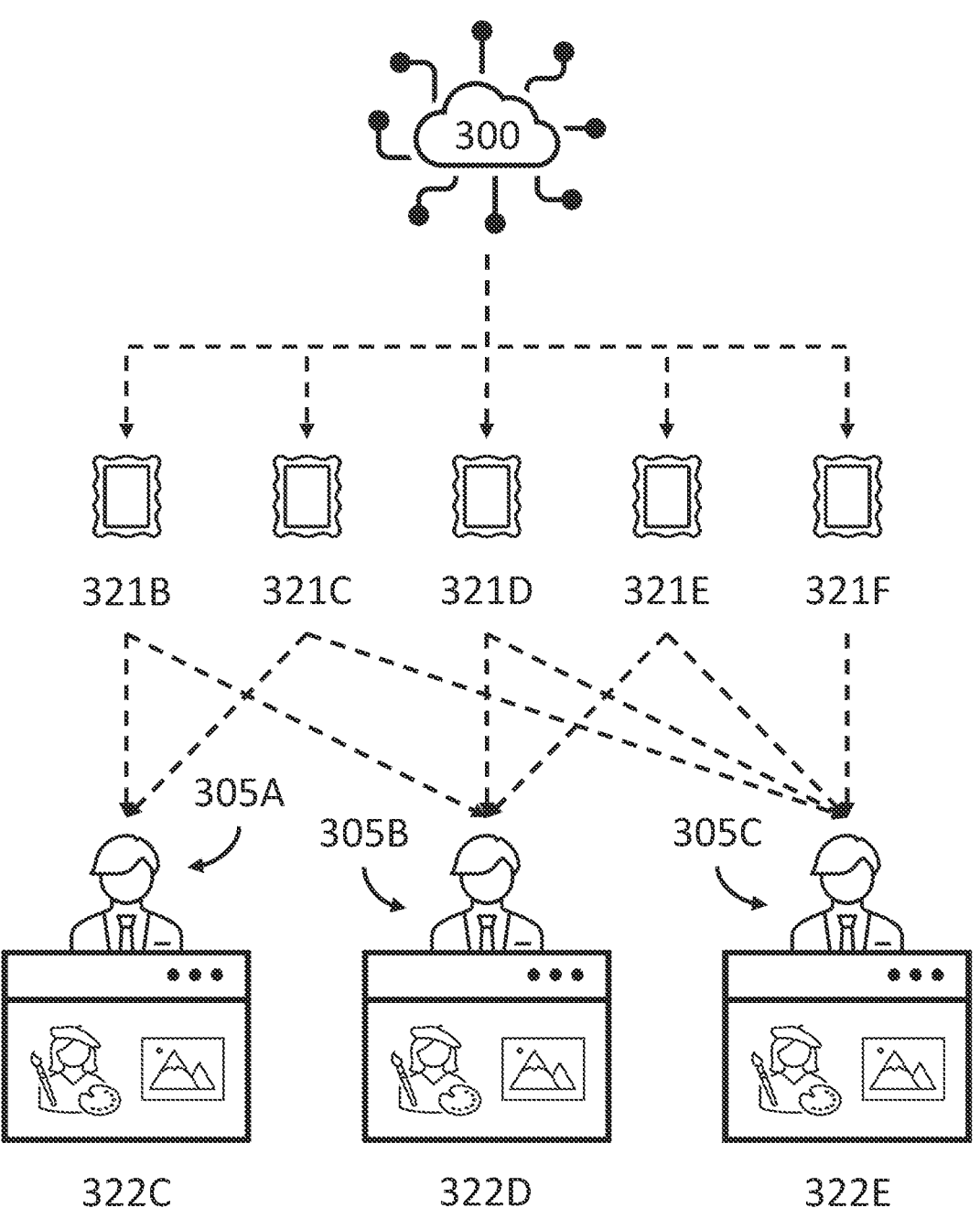
Figure 4:
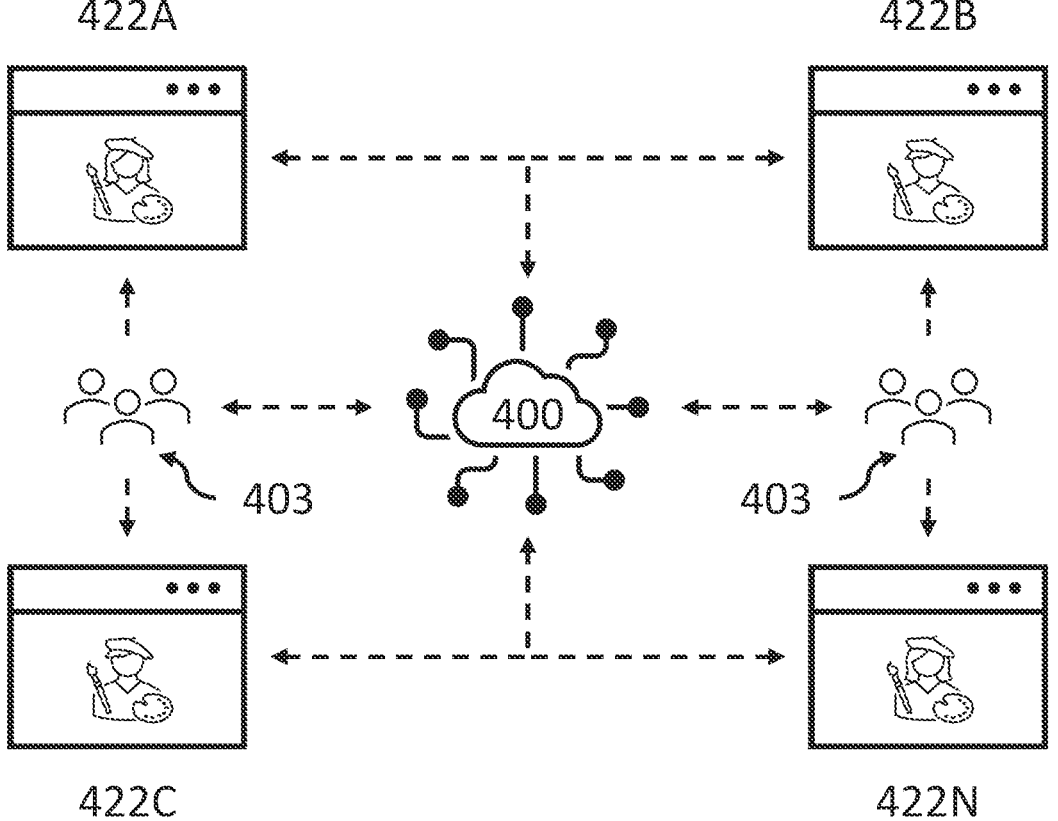
Figure 5A:
Figure 5B:
Figure 6:
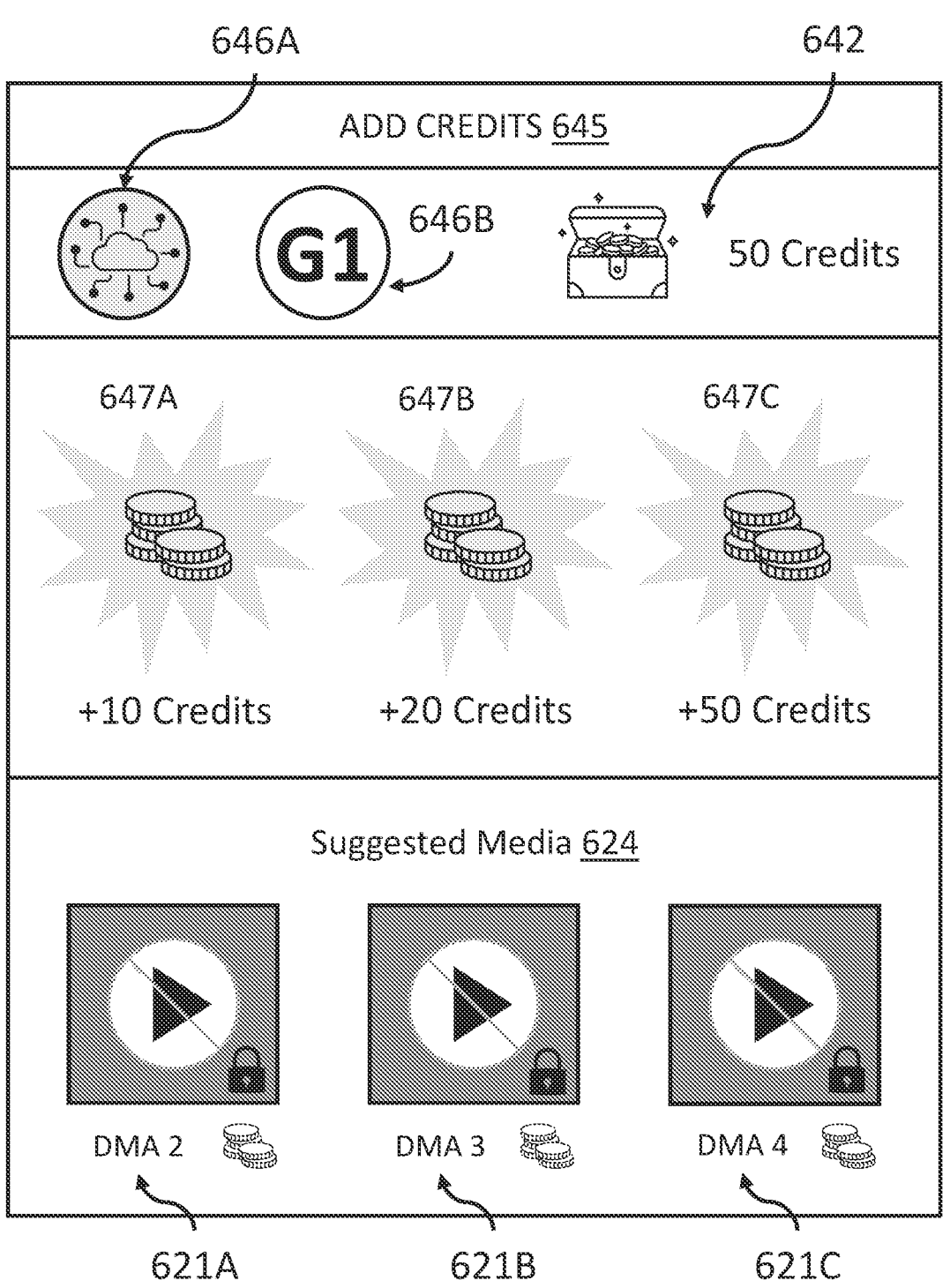
Figure 7A:
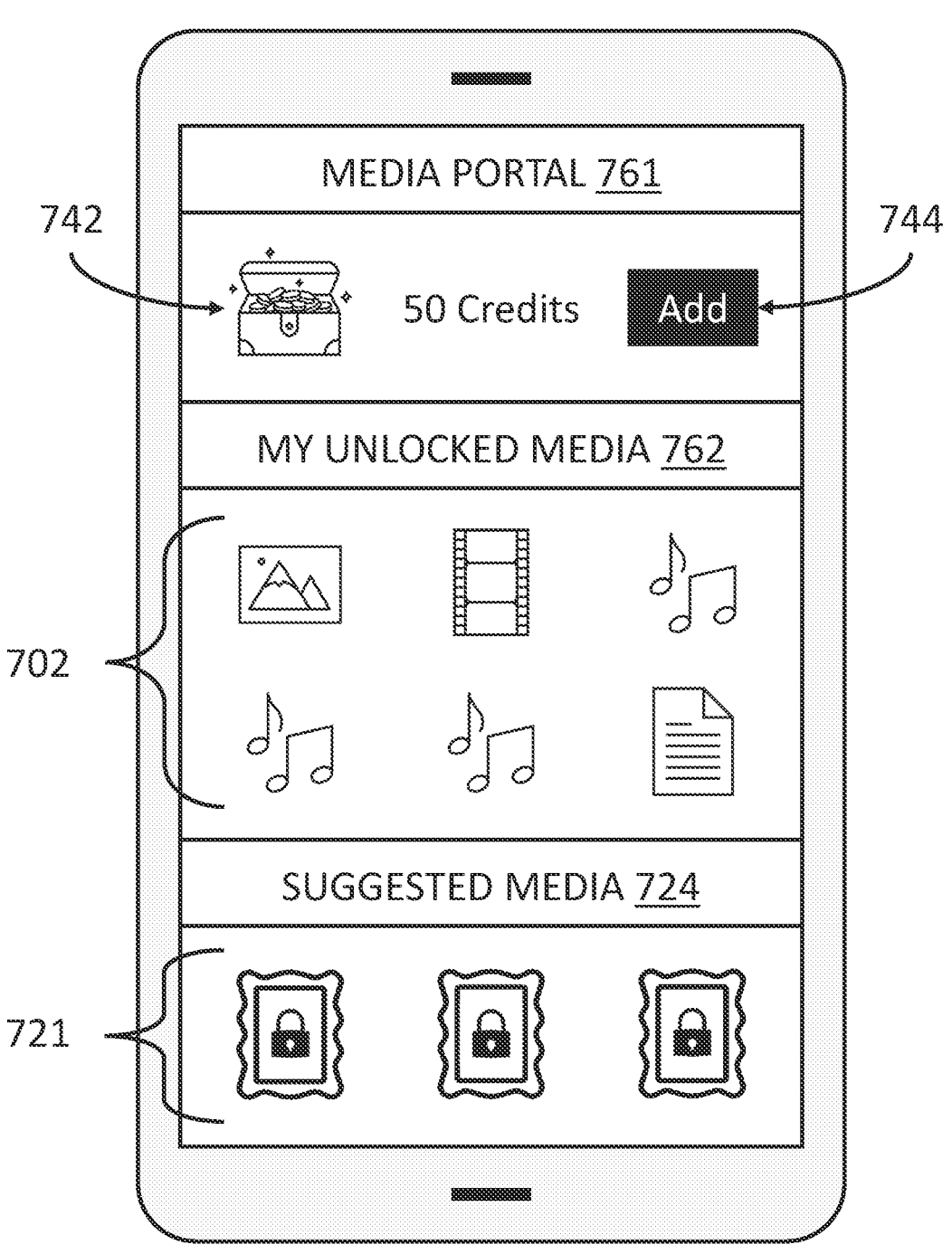
Figure 7B:
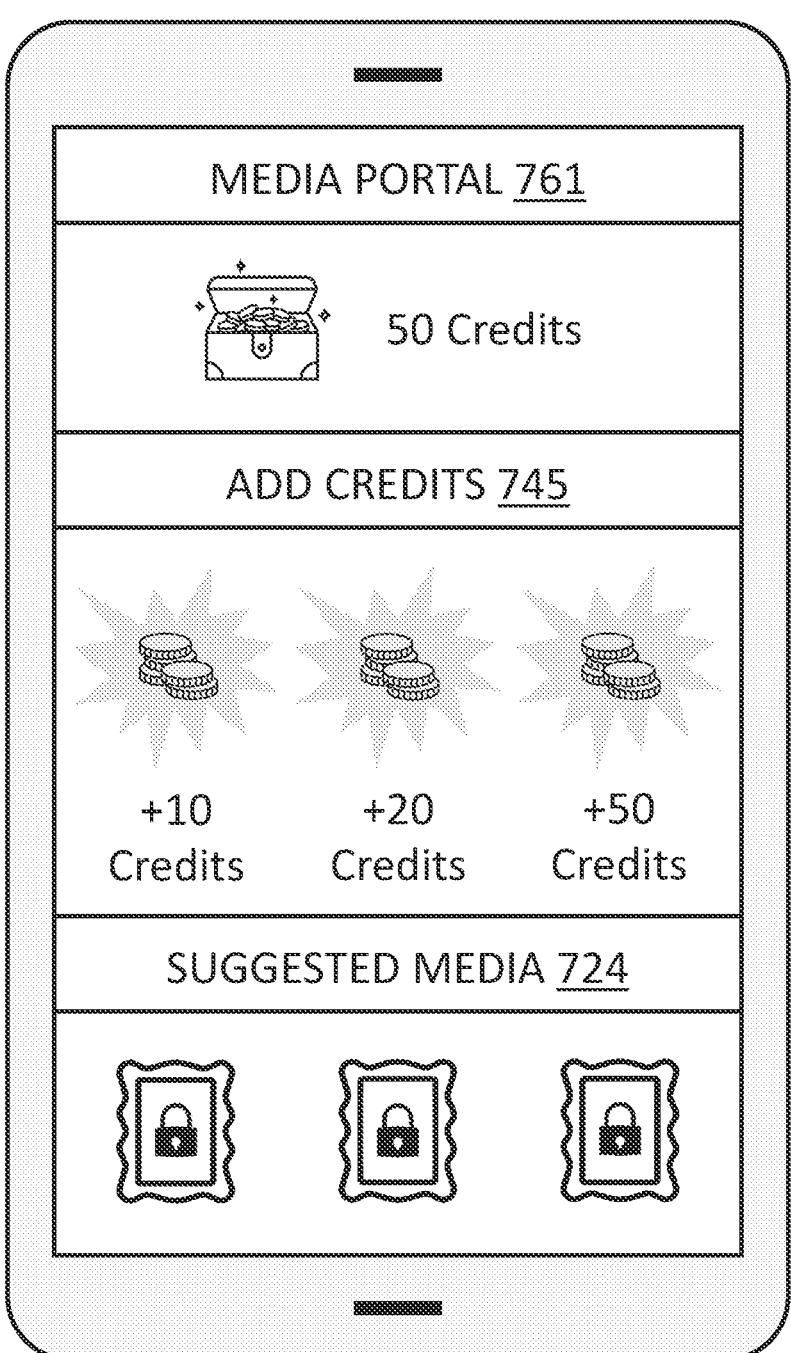
Figure 8:
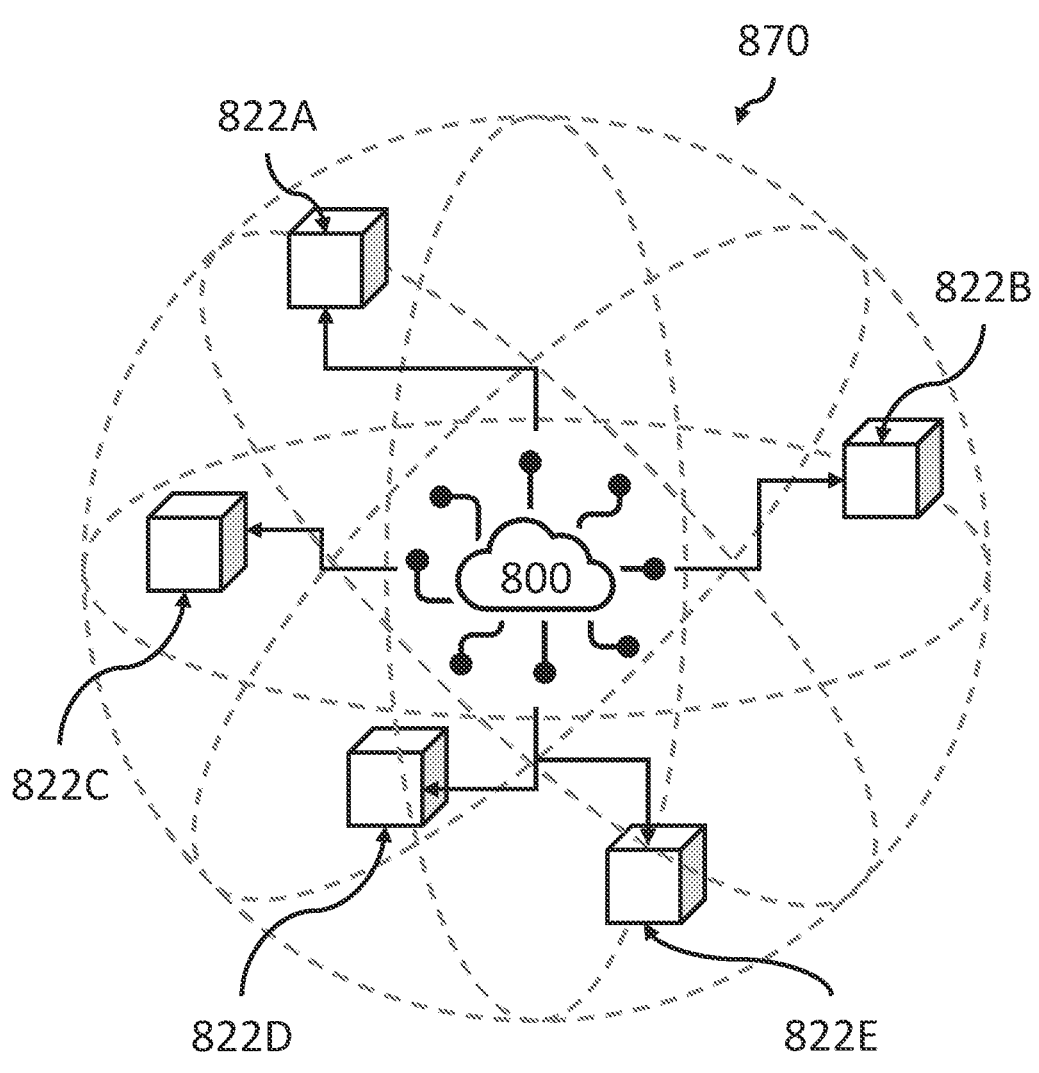
Figure 9:
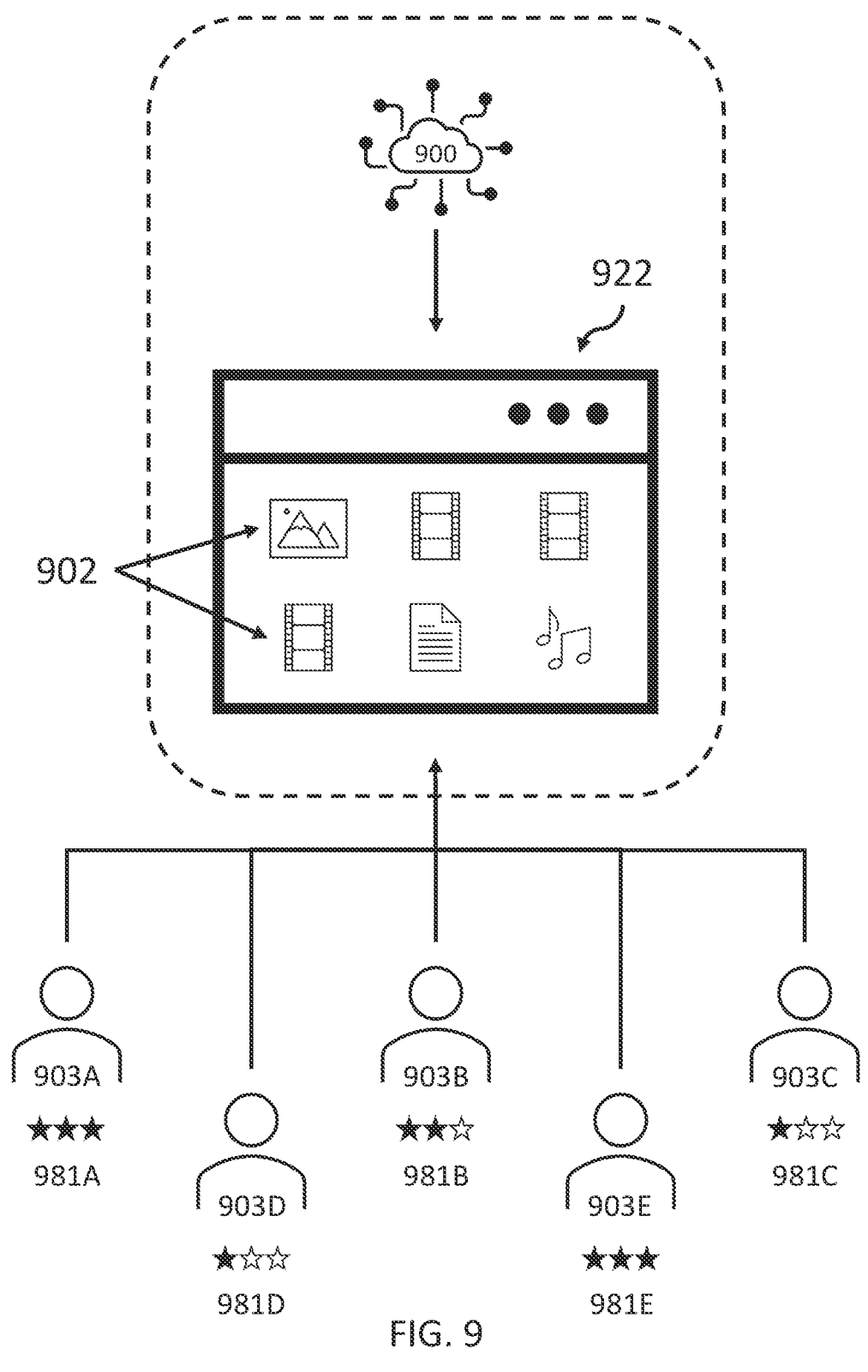
Figure 10:
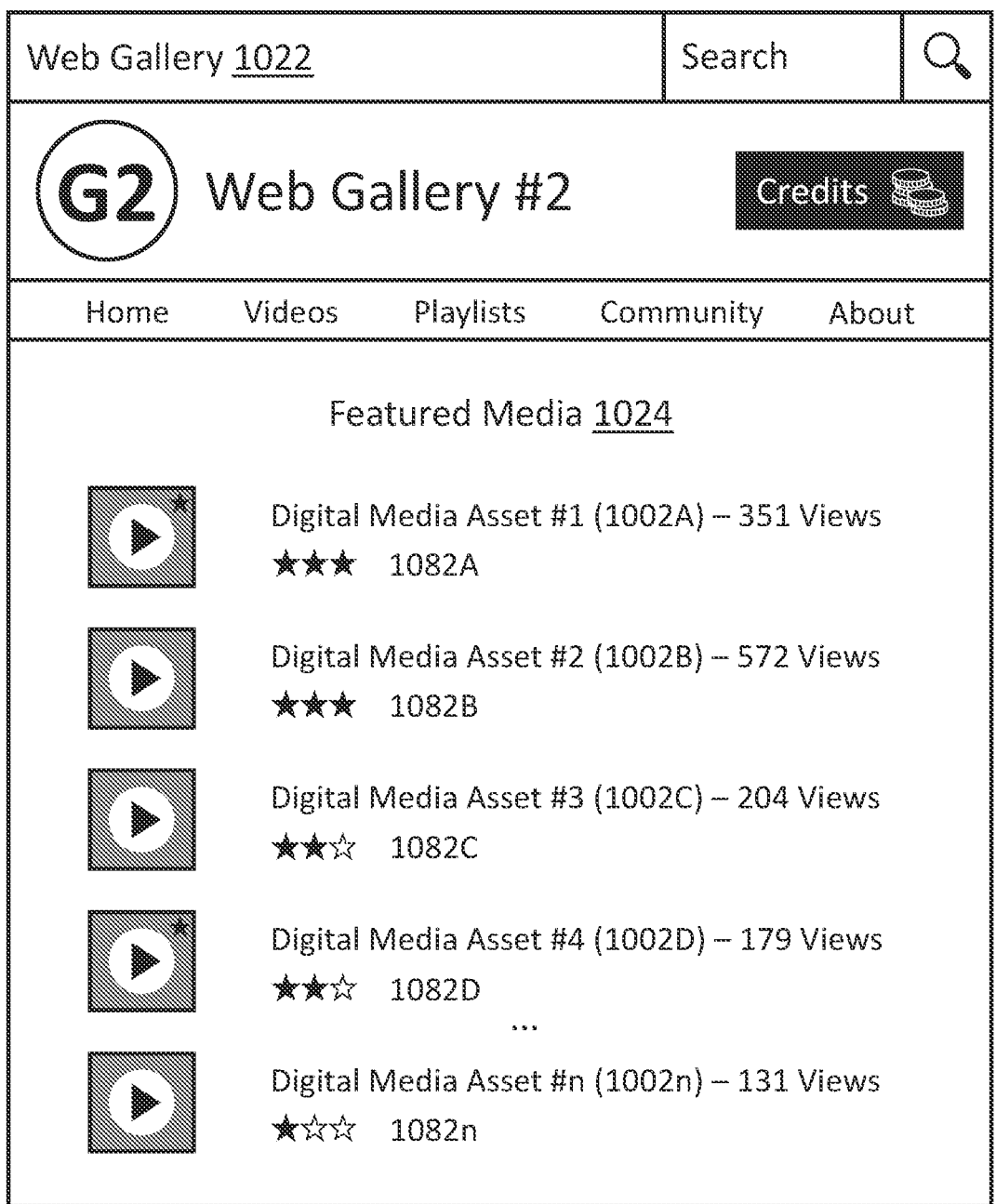
Figure 11A:
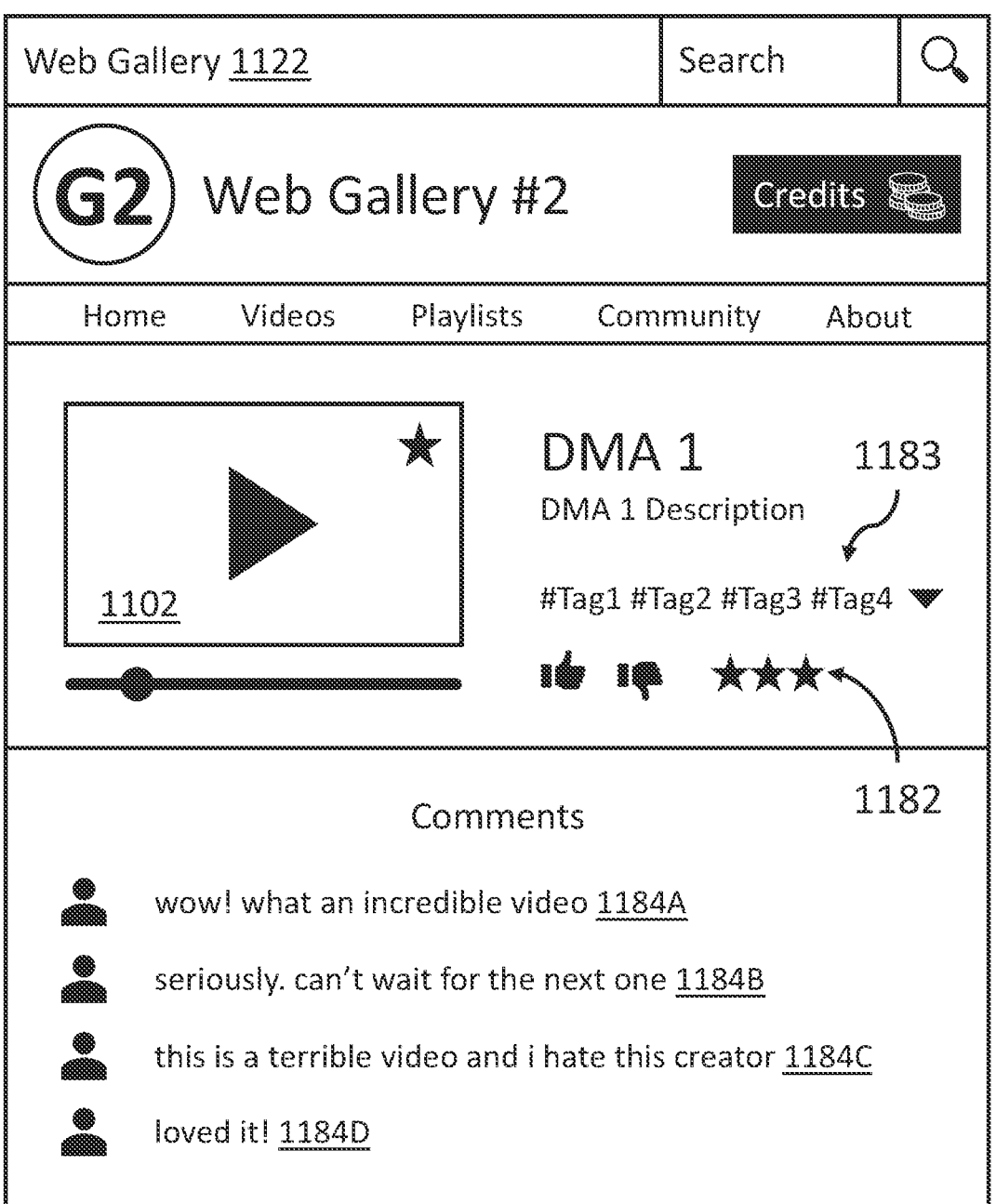
Figure 11B:
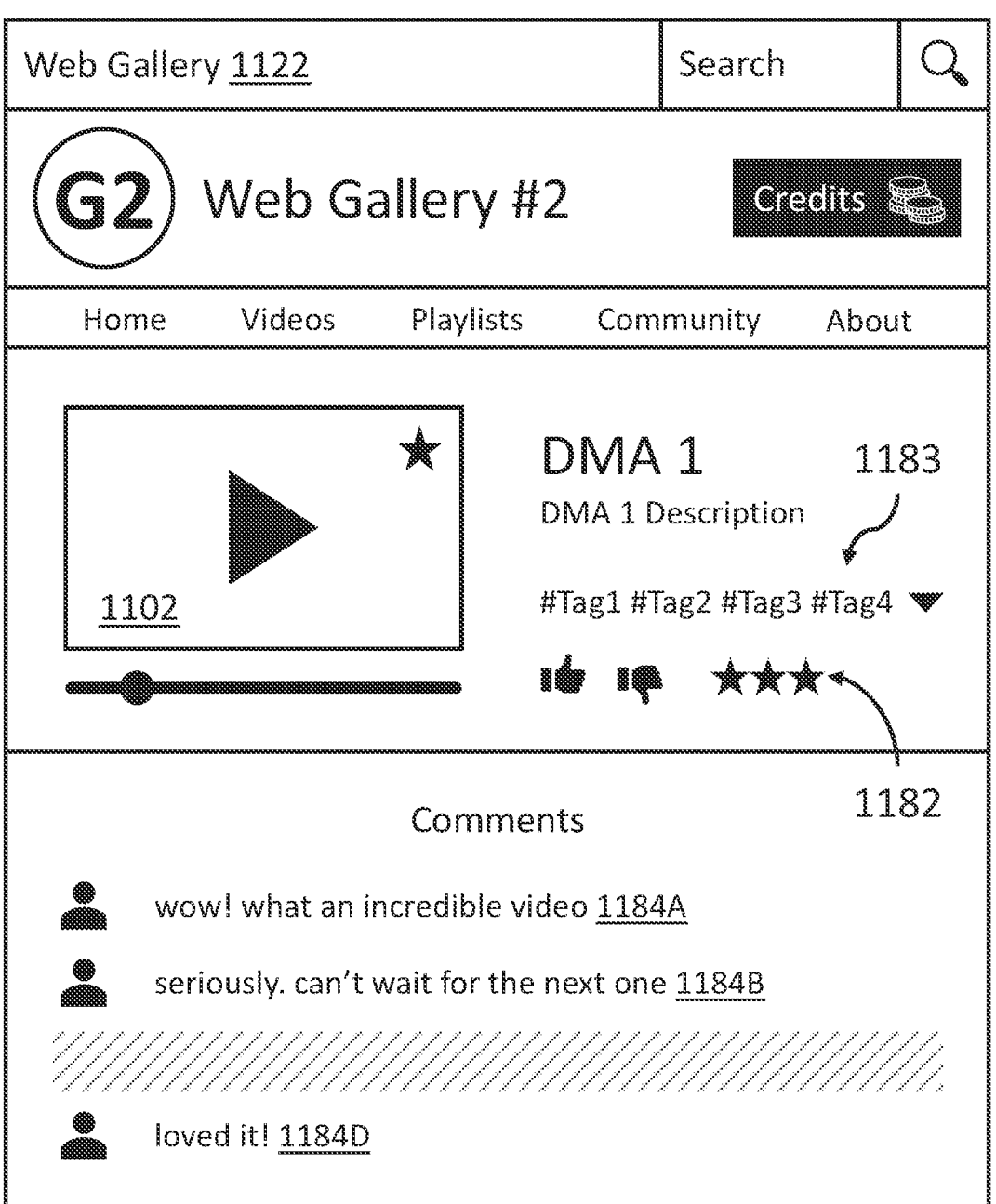
Figure 11C:
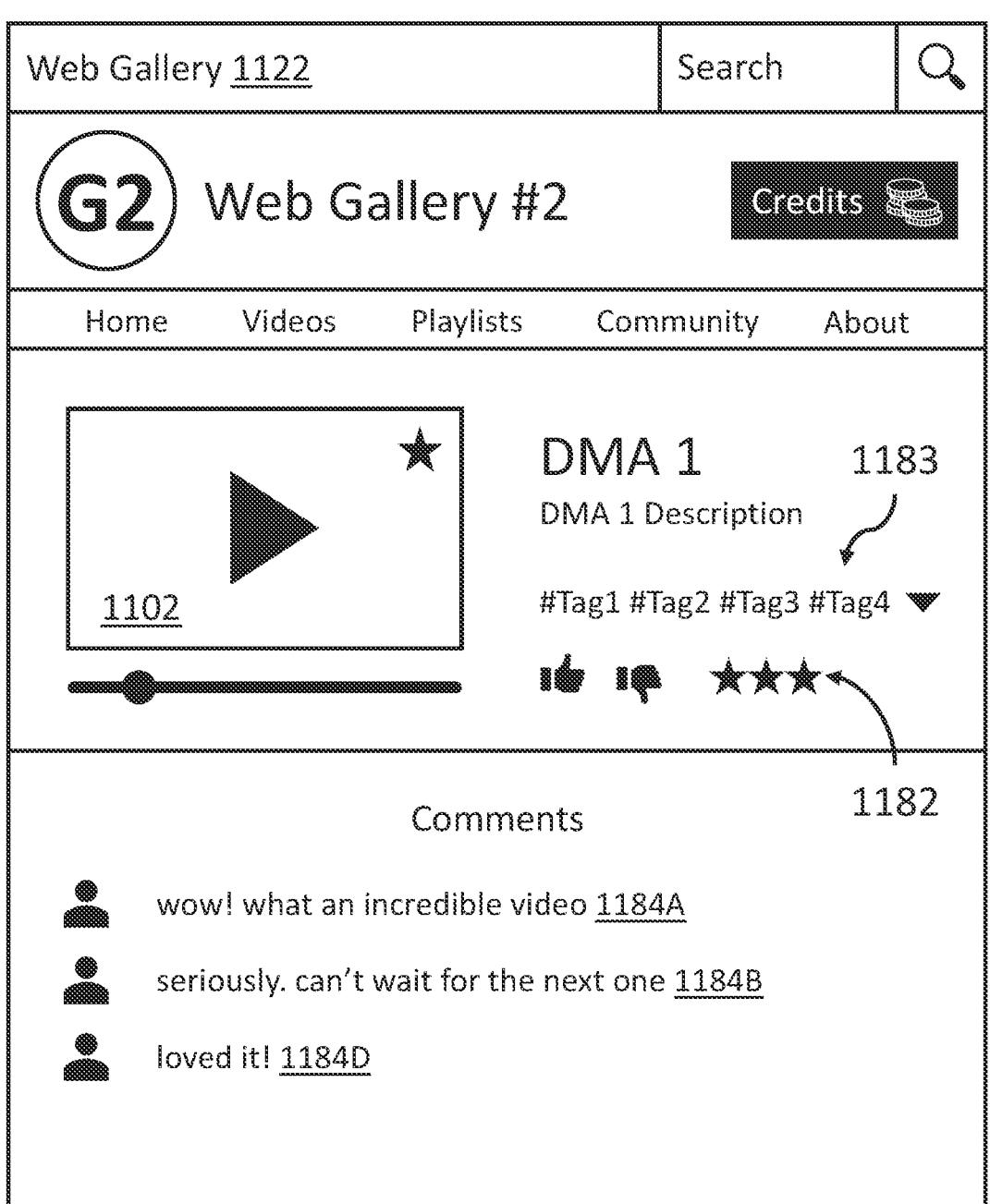
Figure 12:
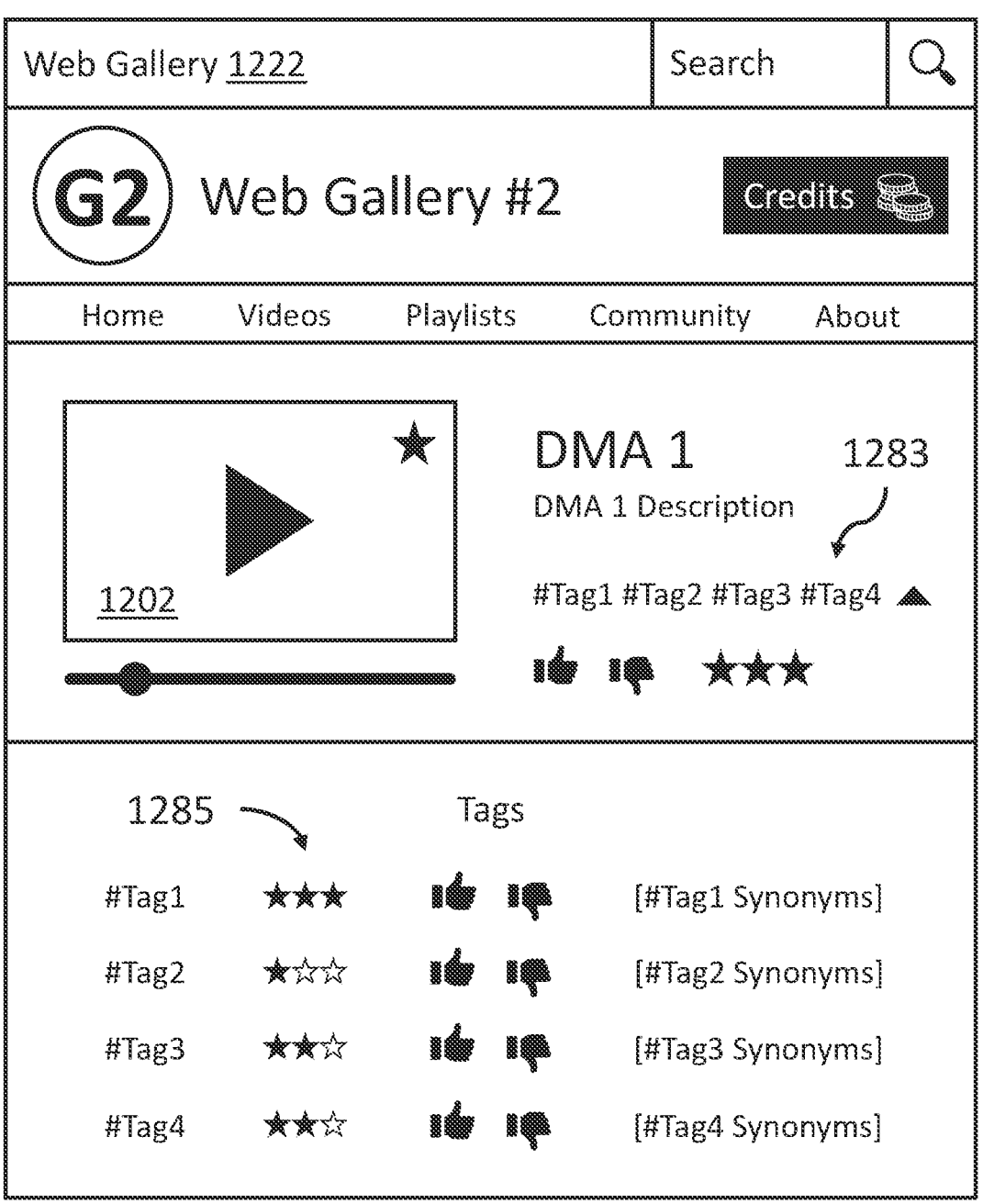

5 tion that sets forth illustrative embodiments, in which the principles of the invention are utilized, and the accompanying drawings of which:

FIG. 1 depicts a diagram of a digital media distribution infrastructure;

FIG. 2 depicts a process for distributing digital media assets in a decentralized manner using a digital media distribution infrastructure;

FIGS. 3A and 3B depict processes for generating a digital media frame and integrating a digital media frame into one or more web galleries;

FIG. 4 depicts a diagram of a network of web galleries facilitated by a digital media distribution infrastructure;

FIGS. 5A and 5B illustrate an exemplary embodiment of a web gallery;

FIG. 6 illustrates an exemplary embodiment of a media credit portal;

FIGS. 7A and 7B illustrate an exemplary embodiment of a digital media portal;

FIG. 8 depicts a diagram of a network of meta galleries facilitated by a digital media distribution infrastructure;

FIG. 9 depicts a diagram of a digital media content prioritization system integrated into a content gallery;

FIG. 10 illustrates an exemplary embodiment of a content gallery;

FIGS. 11A-11C illustrate exemplary embodiments of a content gallery;

FIG. 12 illustrates an exemplary embodiment of a content gallery; and

Figure 13:
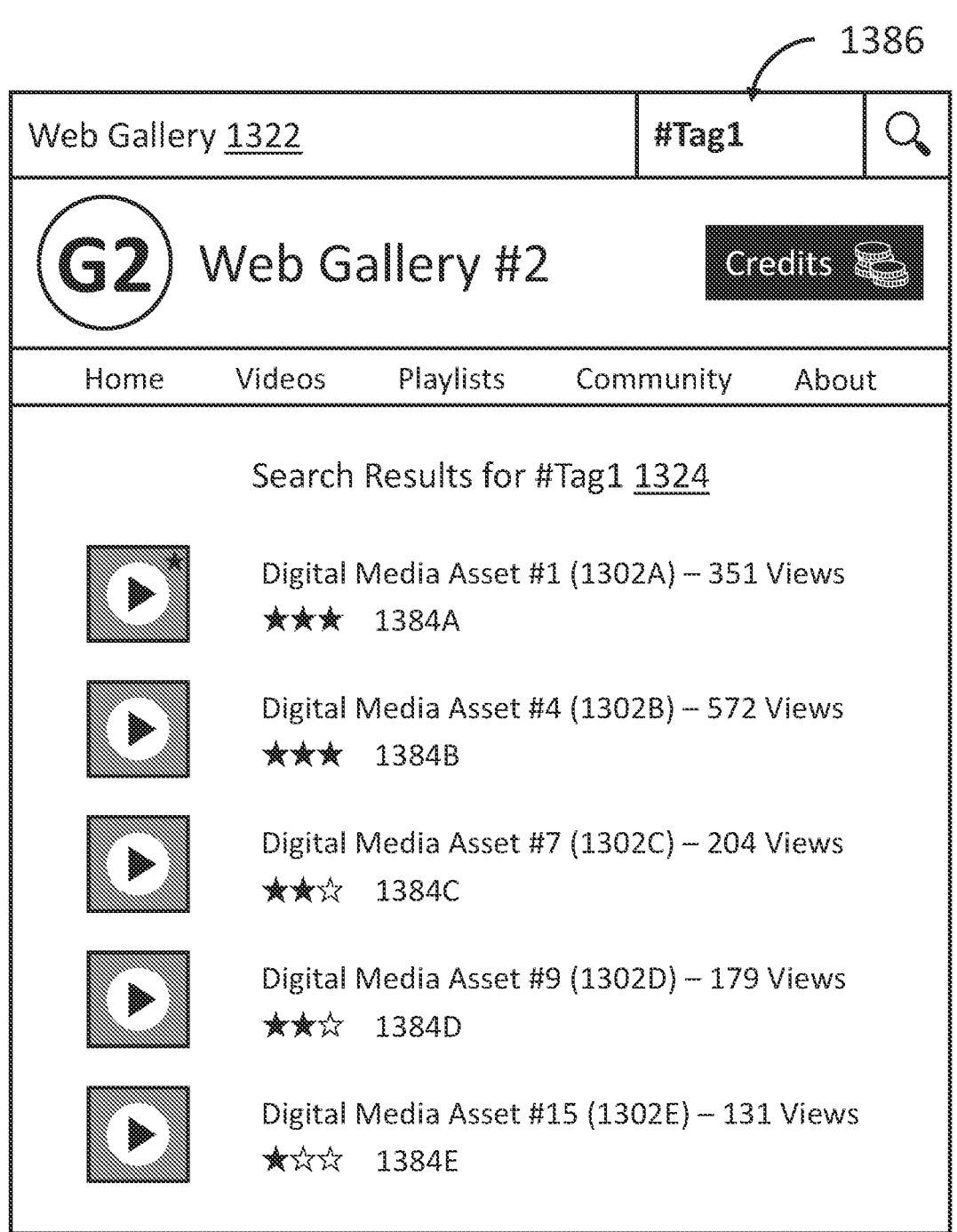

FIG. 13 illustrates an exemplary embodiment of a content gallery.

DETAILED DESCRIPTION OF THE DRAWINGS

Numerous embodiments of the invention will now be described in detail with reference to the accompanying figures. The following description of the embodiments of the invention is not intended to limit the invention to these embodiments but rather to enable a person of ordinary skill in the art to make and use this invention. The variations, configurations, implementations, and applications described herein are optional and not exclusive to the variations, configurations, implementations, and applications they describe. The invention described herein can include any and all permutations of these variations, configurations, implementations, and applications.

In the following description, numerous specific details are set forth in order to provide a thorough understanding of the invention. It will be apparent, however, to one of ordinary skill in the art that the invention can be practiced without these specific details.

Reference in this specification to "one embodiment," "an embodiment," or "some embodiments" means that a particular feature, structure, or characteristic described in connection with the embodiment is included in at least one embodiment of the invention. The appearances of the phrase "in one embodiment" or "in some embodiments" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

6

Digital Media Distribution Infrastructure

While the internet and the digital age have made it easier to produce and access art (i.e., in digital forms), the same cannot be said for commercially distributing art. With physical or real world forms of art, an artist or producer of the art is able to freely charge and collect compensation for the art from patrons wherever the artist or producer has been given a license to do so (e.g., implicitly or explicitly), without further tools or permissions. For example, wherever it is legal, an artist is free to provide their art to the public and charge and collect compensation from their patrons with little more than a hat on the ground. With digital art, however, because digital tools (e.g., websites, media players, file sharing systems, digital payment gateways, etc.) must be built and utilized in order to charge and collect compensation from patrons, artists are much more limited in their ability to commercially distribute their art. Conversely, artists are much more dependent on, and beholden to, third-party services for commercially distributing their art.

Generally, if an artist cannot develop and maintain their own digital warehouse and digital storefront (e.g., a server system to store and retrieve their art, and a website with a digital payment gateway, respectively), which can be a technically difficult and resource intensive endeavor, the artist must provide their art to a third-party distribution platform (hereinafter, "distribution platform") that can sell their art to consumers on the artist's behalf. For example, a musician can provide a song to a distribution platform such as Spotify, a writer can provide a novel to a distribution platform such as Amazon's Kindle Direct Publishing, or a video artist can provide a video to a distribution platform such as YouTube. However, in exchange for providing an artist with a digital warehouse and digital storefront, a distribution platform generally can and will impose various limitations and stipulations on the artist, including, but not limited to, the amount of money that the artist can charge or receive for their art, the type of content that their art can include, and which consumers that the their art is marketed to. For example, on Spotify, it has been reported that a musician receives less than half of a cent (<$0.005) per stream of the musician's song. Or for example, on YouTube, it has been reported that a video earns less than half of a cent (<$0.005) per view. On both Spotify and YouTube, songs and videos that are recommended to users of the distribution platform are decided by the respective distribution platform's curators or algorithms. On some distribution platforms, like Spotify and YouTube, on which artists are compensated per stream or per view, an artist who provides their art to the distribution platform retains ownership rights over their art. On some distribution platforms, like Netflix, an artist who provides their art to the distribution platform must sell the ownership rights over their art to the distribution platform in exchange for a one-time, lump sum payment from the distribution platform. Thus, ultimately, if an artist is unable to develop and maintain their own digital warehouse and digital storefront, the artist must generally sacrifice some combination of ownership, agency, and profit in order to commercially distribute their art. This paradigm can have a profound effect not only on the artists themselves, whose livelihoods often suffer, but on the quality of the art that they produce. Similarly, because the means of commercializing digital art are difficult to develop or otherwise acquire, the legitimate distribution platform options for commercializing digital art are few. And, because the distribution platform options are so few, the current market for digital art fails to adequately support every niche of digital art, further harming the artists.

In various embodiments, disclosed herein are methods and systems for providing and facilitating a distribution infrastructure for digital media assets (hereinafter, "digital media distribution infrastructure"). In some embodiments, the digital media distribution infrastructure (DMDI) allows a digital media producer (e.g., a digital media artist) to commercialize a digital media asset through a digital territory (e.g., a web domain, a software application, or any other uniquely addressable digital resource). In some embodiments, the DMDI generates a digital media frame (e.g., an application programming interface (API)) for a digital media asset submitted to the DMDI by the digital media producer that can be executed within a graphical user interface (GUI) of any digital territory. In some embodiments, a digital media consumer can access the digital media asset through the digital media frame. In some embodiments, a digital media consumer can access the digital media asset through the digital media frame only if the digital media consumer is associated with a media credit account provided by the DMDI that contains an amount of media credits equal to or greater than a media credit value established for the digital media asset. In some embodiments, the media credit value established for the digital media asset is determined by the digital media producer. In some embodiments, a portion of the media credits deducted from a media credit account associated with a digital media consumer by the DMDI to provide the digital media consumer with access to a digital media asset through a digital media frame is added to a media credit account associated with the digital media producer that submitted the digital media asset to the DMDI. In some embodiments, the DMDI can generate a plurality of digital media frames for a respective plurality of digital media assets submitted to the DMDI by a respective plurality of digital media producers, and a digital media consumer can access the plurality of digital media assets through the respective plurality of digital media frames executed within the GUIs of a respective plurality of digital territories. In some embodiments, a digital media curator can integrate one or more digital media frames generated for digital media assets that the digital media curator did not submit to the DMDI into a digital territory associated with the digital media curator. In some embodiments, when a digital media consumer access a digital media asset through a digital media frame integrated by a digital media curator into a digital territory associated with the digital media curator, a portion of the media credits deducted from a media account associated with the digital media consumer by the DMDI to provide the digital media consumer with access to the digital media asset through the digital media frame is added to a media credit account associated with the digital media curator.

As mentioned above, in various embodiments, disclosed herein are methods and systems for providing and facilitating a distribution infrastructure for digital media assets (also referred to as a "digital media distribution infrastructure" or a "DMDI"). FIG. 1 depicts a diagram of an exemplary embodiment of a digital media distribution infrastructure (DMDI). As depicted in FIG. 1, in some embodiments, a DMDI 100 includes one or more modules (e.g., software modules), such as digital media ingestion module 110 and digital media frame generation module 120. In some embodiments, the DMDI 100 additionally includes a digital media valuation module 130, a media credit management module 140, a search and discovery module 150, or a digital media portal module 160. In general, the modules of the DMDI 100 function cooperatively to receive a digital media asset 102 (e.g., image file 102A, video file 102B, text file 102C, or audio file 102D), generate a digital media frame 121 for the digital media asset 102, and manage the accessing of the digital media asset 102 through the digital media frame 121. The various functions of the DMDI 100 and the modules included therein are described in further detail below.

FIG. 2 depicts an exemplary process for distributing digital media assets in a decentralized manner using a digital media distribution infrastructure. As described above, in general, if an artist cannot develop and maintain their own digital warehouse (e.g., a server system to store and retrieve their art) and a digital storefront (e.g., a website with a digital payment gateway), the artist must provide their art to a distribution platform that can commercialize the artist's art on the artist's behalf. And, generally, such distribution platforms can and will impose debilitating limitations and stipulations on the artist and their art. In various embodiments, as depicted in FIG. 2, a digital media distribution infrastructure (DMDI) 200 can receive a digital media asset 202 from digital media producer 201 (e.g., an artist) and generate a digital media frame 221 for the digital media asset 202, which can be integrated into any digital territory. As described below, in various embodiments, a digital media consumer 203 can acquire media credits 241 from the DMDI 200 and use the media credits 241 to access the digital media asset 202 through the digital media frame 221. As described below, in various embodiments, the DMDI 200 can then add a portion (e.g., some or all) of the media credits 241 used by the digital media consumer 203 to access the digital media asset 202 through the digital media frame 221 to a media credit account associated with the digital media producer 201. Thus, effectively, the digital media frame 221 serves as both an access point to the digital media asset 202 and a point of sale for media credit transactions, thereby providing the digital media producer 201 with their own digital storefront. The DMDI 200 stores the digital media asset 202 submitted to the DMDI 200 by the digital media producer 201 within one or more digital media databases included in, or otherwise communicatively coupled to, the DMDI 200, from which the digital media asset 202 can be retrieved when accessed through the digital media frame 221, thereby providing the digital media producer 201 with a digital warehouse. By providing digital media producers 201 with a digital warehouse and their own digital storefronts, the DMDI 200 facilitates an infrastructure for distributing digital media assets in a decentralized manner.

Digital Media Frames

In some embodiments, a process for distributing digital media assets in a decentralized manner begins with a digital media producer 201 (e.g., an artist), such as videographer 201A, submitting a digital media asset 202 (e.g., video file 202A) to a digital media distribution infrastructure (DMDI) 200 (e.g., by employing the digital media ingestion module 110, as depicted in FIG. 1). In some embodiments, after receiving the digital media asset 202, the DMDI 200 stores the digital media asset 202 in one or more digital media databases. In some embodiments, after receiving the digital media asset 202, the DMDI 200 generates a digital media frame 221 (e.g., digital media frame 221A) for the digital media asset 202 (e.g., by employing the digital media frame generation module 120, as depicted in FIG. 1) and establishes a media credit value for the digital media asset 202 (e.g., by employing the digital media valuation module 130, as depicted in FIG. 1), as described below. In some embodiments, the digital media frame 221 is a compilation of programming commands (e.g., a software script) that, when executed, prompts a software system (e.g., a website, a web application, or a mobile application) into which the digital media frame 221 has been integrated to display a widget (e.g., an interactive graphical element) within a graphical user interface (GUI) of the software system through which the digital media asset 202 can be accessed. In some embodiments, the digital media frame 221 is an application programming interface (API). A software system into which a digital media frame 221 has been integrated is referred to hereinafter as a web gallery (e.g., web gallery 222A).

In some embodiments, the DMDI 200 provides a GUI (e.g., a website) through which a digital media producer 201 can submit a digital media asset 202 to the DMDI 200. In some embodiments, when a digital media producer 201 submits a digital media asset 202 to the DMDI 200, the digital media producer 201 submits information regarding the digital media asset 202 as well (e.g., through a GUI provided by the DMDI 200). For example, in some embodiments, the digital media producer 201 can submit information regarding the digital media asset 202 such as a title of the digital media asset 202, a name of the creator or the digital media producer of the digital media asset 202, a written description of the digital media asset 202, or tags describing the digital media asset 202. In some embodiments, some or all of the information regarding the digital media asset 202 submitted by the digital media producer 201 is displayed by a digital media frame 221 (e.g., the widget of the digital media frame 221) generated by the DMDI 200 for the digital media asset 202 when the digital media frame 221 (e.g., the widget of the digital media frame 221) is displayed within the GUI of a web gallery 222 into which the digital media frame 221 has been integrated. In some embodiments, when the digital media producer 201 submits a digital media asset 202 to the DMDI 200, the digital media producer 201 establishes a media credit value for the digital media asset 202 (e.g., by employing the digital media valuation module 130, as depicted in FIG. 1). In some embodiments, when the digital media producer 201 submits a digital media asset 202 to the DMDI 200, the DMDI 200 establishes a media credit value for the digital media asset 202 (e.g., by employing the digital media valuation module 130, as depicted in FIG. 1). For example, in some embodiments, the DMDI 200 establishes a media credit value for a digital media asset 202 based at least in part on a length of the digital media asset 202 (e.g., the length of an audio or video file) or a file size of the digital media asset 202. However, the DMDI 200 may establish a media credit value for a digital media asset 202 in any other way. In some embodiments, the media credit value established for the digital media asset 202 is displayed by a digital media frame 221 (e.g., the widget of the digital media frame 221) generated by the DMDI 200 for the digital media asset 202 when the digital media frame 221 (e.g., the widget of the digital media frame 221) is displayed within the GUI of a web gallery 222 into which the digital media frame 221 has been integrated, as described below.

In some embodiments, the form and function of the widget of a digital media frame 221 that is displayed within the GUI of a web gallery 222 depends on the type of digital media asset 202 for which the digital media frame 221 was generated. For example, in some embodiments, if the digital media asset 202 for which a digital media frame 221 was generated is an audio file, the widget of the digital media frame 221 that is displayed within the GUI of a web gallery 222 into which the digital media frame 221 is integrated will be in the form of an audio player interface, and, when the digital media frame 221 is unlocked (as described below), the widget will perform functions of an audio player application. In some embodiments, if the digital media asset 202 for which a digital media frame 221 was generated is a video file, the widget of the digital media frame 221 that is displayed within the GUI of a web gallery 222 into which the digital media frame 221 is integrated will be in the form of a video player interface, and, when the digital media frame 221 is unlocked (as described below), the widget will perform the functions of a video player application. In some embodiments, if the digital media asset 202 for which a digital media frame 221 was generated is a text file, the widget of the digital media frame 221 that is displayed within the GUI of a web gallery 222 into which the digital media frame 221 is integrated will be in the form of a text viewer interface, and, when the digital media frame 221 is unlocked (as described below), the widget will perform the functions of a text viewer application. In some embodiments, if the digital media asset 202 for which a digital media frame 221 was generated is an image file, the widget of the digital media frame 221 that is displayed within the GUI of a web gallery 222 into which the digital media frame 221 is integrated will be in the form of an image viewer interface, and, when the digital media frame 221 is unlocked (as described below), the widget will perform the functions of an image viewer application. However, the widget of a digital media frame 221 may take on any form or perform any function.

In some embodiments, when a digital media frame 221 is integrated into a web gallery 222, the digital media frame 221 (e.g., the widget of the digital media frame 221) is initially (e.g., when a digital media consumer 203 first accesses the web gallery 222) presented within the GUI of the web gallery 222 in a locked state. When the digital media frame 221 (e.g., the widget of the digital media frame 221) is displayed within the GUI of a web gallery 222 in a locked state, the digital media frame 221 (e.g., the widget of the digital media frame 221) will not allow a digital media consumer 203 to access the digital media asset 202 for which the digital media frame 221 was generated. For example, if the digital media asset 202 for which a digital media frame 221 was generated is a video file (e.g., video file 202A), and the digital media frame 221 is displayed within the GUI of a web gallery 222 in a locked state, the digital media frame 221 (e.g., the widget of the digital media frame 221) will not allow a digital media consumer 203 to download the video file or stream the video file within the GUI of the web gallery 222. However, in some embodiments, when a digital media frame 221 is displayed within the GUI of a web gallery 222 into which the digital media frame 221 has been integrated in a locked state, the digital media frame 221 (e.g., the widget of the digital media frame 221) can display a preview of the digital media asset 202 for which the digital media frame 221 was generated. For example, if the digital media asset 202 for which a digital media frame 221 was generated is a video file (e.g., video file 202A), when the digital media frame 221 is displayed within the GUI of a web gallery 222 in a locked state, the digital media frame 221 may display only the first few seconds of the video file if selected by or hovered over by a digital media consumer 203. Or, for example, in some embodiments, if the digital media asset 202 is a text file, the locked digital media frame 221 may display only the first few lines of the text file as a preview of the text file. Or, for example, if the digital media asset 202 is an image file, the locked digital media frame 221 may display the image file with a watermark superimposed over the image file. In some embodiments, a digital media frame 221 is displayed within the GUI of a web gallery 222 in a locked state until the DMDI 200 successfully deducts an amount of media credits 241 equal to the media credit value (as described below) established for the digital media asset 202 for which the digital media frame 221 was generated from a media credit account 242 (as described below) associated with a digital media consumer 203 who has selected the digital media frame 221 from within the GUI of the web gallery 222 (e.g., by employing media credit management module 140, as depicted in FIG. 1). In some embodiments, the digital media frame 221 will then be unlocked by the DMDI 200 and displayed within the GUI of the web gallery 222 in an unlocked state (as described below). In some embodiments, a digital media frame 221 is initially displayed within the GUI of a web gallery 222 into which the digital media frame 221 has been integrated in an unlocked state (as described below) only if the media credit value (as described below) established for the digital media asset 202 for which the digital media frame 221 was generated is zero credits.

In some embodiments, when a digital media frame 221 has been unlocked, or when the digital media frame 221 (e.g., the widget of the digital media frame 221) is displayed within the GUI of a web gallery 222 in an unlocked state (e.g., the media credit value established for the digital media asset 202 for which the digital media frame 221 was generated is zero credits, or the DMDI 200 has successfully deducted an amount of media credits 241 equal to the media credit value established for the digital media asset 202 for which the digital media frame 221 was generated from a media credit account 242 associated with a digital media consumer 203 who has selected the digital media frame 221 from within the GUI of the web gallery 222, as described below), the DMDI 200 will provide the digital media asset 202 for which the digital media frame 221 was generated to the web gallery 222 for access by a digital media consumer 203. For example, in some embodiments, when a digital media frame 221 has been unlocked, or when the digital media frame 221 (e.g., the widget of the digital media frame 221) is displayed within the GUI of a web gallery 222 in an unlocked state, a digital media consumer 203 may download (e.g., onto the electronic device that the digital media consumer 203 is accessing the web gallery 222 on) the digital media asset 202 for which the digital media frame 221 was generated. Or, for example, in some embodiments, when a digital media frame 221 has been unlocked, or when the digital media frame 221 (e.g., the widget of the digital media frame 221) is displayed within the GUI of a web gallery 222 in an unlocked state, a digital media consumer 203 may stream the digital media asset 202 for which the digital media frame 221 was generated through the GUI of the web gallery 222 (e.g., through the widget of the digital media frame 221).

In some embodiments, a digital media frame 221 does not have a widget, and can be paired with a pre-existing interactive graphical element built into the web gallery 222. For example, in some embodiments, a digital media producer 201 can integrate a digital media frame 221 into a media player of their choice that has been previously built into a web gallery 222. In such an embodiment, the media player may not change in appearance when the digital media frame 221 is locked or unlocked. However, regardless of the appearance of the media player into which the digital media frame 221 has been integrated, the DMDI 200 will not provide the digital media asset 202 for which the digital media frame 221 was generated to the web gallery 222 until the digital media frame 221 has been unlocked. In some embodiments, if a digital media consumer 203 selects, within the GUI of a web gallery 222, a pre-existing interactive graphical element (e.g., a media player) into which a digital media frame 221 has been integrated, the DMDI 200 will attempt to deduct the media credit value established for the digital media asset 202 for which the digital media frame 221 was generated from a media credit account 242 associated with the digital media consumer 203. If the DMDI 200 successfully deducts the media credit value established for the digital media asset 202 for which the digital media frame 221 was generated from the media credit account 242 associated with the digital media consumer 203, the DMDI 200 will provide the digital media asset 202 to the web gallery 222 for the digital media consumer 203 to access through the pre-existing interactive graphical element. In some embodiments, if the DMDI 200 is unable to deduct the media credit value established for the digital media asset 202 for which the digital media frame 221 was generated from the media credit account 242 associated with the digital media consumer 203, the pre-existing interactive graphical element will function as a link that directs the digital media consumer 203 to a media credit portal (as described below).

Web Galleries

FIG. 3A depicts a process for generating a digital media frame and integrating the digital media frame into one or more web galleries. In some embodiments, an individual digital media frame generated for a digital media asset may be integrated into only one web gallery. In some embodiments, an individual digital media frame generated for a digital media asset may be integrated into a plurality of web galleries. For example, in the example depicted by FIG. 3A, a digital media producer 301 (e.g., a graphical artist) creates a digital media asset 302 (e.g., an image file of a new graphic) and submits the digital media asset 302 to the digital media distribution infrastructure (DMDI) 300. The DMDI 300 generates a digital media frame 321 (e.g., digital media frame 321A) for the digital media asset 302 and provides the digital media frame 321 to the digital media producer 301. In this example, the digital media producer 301 then integrates the digital media frame 321 into two different web galleries 322, web gallery 322A and web gallery 322B. In this example, web galleries 322A and 322B exist on and are accessed (e.g., by digital media consumers) through two different digital territories. A digital territory is a uniquely addressable digital entity, such as a website (e.g., a web domain), a web application, or a mobile application. In the example depicted by FIG. 3A, web gallery 322A is a website (e.g., the digital media producer's website), and web gallery 322B is a mobile application executed on a tablet device.

FIG. 3B depicts a process for generating a digital media frame and integrating the digital media frame into one or more web galleries. In some embodiments, a plurality of digital media frames generated for a respective plurality of digital media assets may be integrated into a single web gallery. For example, in the example depicted by FIG. 3B, the DMDI 300 has generated five digital media frames 321 (e.g., digital media frames 321B-321F), and two or more of the five digital media frames 321 have been integrated into each of three web galleries 322 (e.g., web galleries 322C-322E). For example, digital media frames 321B and 321C have been integrated into web gallery 322C, digital media frames 321B, 321D, and 321E have been integrated into web gallery 322D, and digital media frames 321C-321F have been integrated into web gallery 322E. In some embodiments, a digital media frame 321 generated for a digital media asset by the DMDI 300 is only provided to the digital media producer that submitted the digital media asset to the DMDI 300, so that the digital media frame 321 may only be integrated into web galleries 322 of the digital media producer's choice. However, in some embodiments, a digital media frame 321 generated for a digital media asset by the DMDI 300 is provided to anyone (e.g., any user of the DMDI 300), so that the digital media frame 321 may be integrated into any web gallery 322.

In some embodiments, a user of the DMDI 300 that integrates, into a web gallery 322, a digital media frame 321 generated for a digital media asset that the user did not submit to the DMDI 300 (i.e., the user is not the digital media producer associated with the digital media asset) is referred to as a digital media curator 305. For example, in the example depicted by FIG. 3B, the three web galleries 322C-322E are associated with three respective digital media curators 305A-305C. In this example, digital media curator 305A has integrated digital media frames 321B and 321C into web gallery 322C; digital media curator 305B has integrated digital media frames 321B, 321D, and 321E into web gallery 322D; and digital media curator 305C has integrated digital media frames 321C-321F into web gallery 322E. By allowing a digital media curator 305 to integrate one or more digital media frames 321 into a web gallery 322, the DMDI 300 provides the digital media curator 305 with the ability to create a curated collection of digital media assets, much like a curator of a real world art gallery. In some embodiments, when a digital media curator 305 integrates a digital media frame 321 into a web gallery 322 associated with the digital media curator 305, and a digital media consumer unlocks the digital media frame 321 by selecting the digital media frame within the GUI of the web gallery 322 and allowing the DMDI 300 to deduct, from a media credit account associated with the digital media consumer, an amount of media credits equal to the media credit value established for the digital media asset for which the digital media frame 321 was generated (as described above and below), the DMDI 300 adds a portion of the media credits deducted from the media credit account associated with the digital media consumer to a media credit account associated with the digital media curator 305 (e.g., alternatively or in addition to any portion of the media credits deducted from the media credit account associated with the digital media consumer and added to a media credit account associated with the digital media producer that submitted the digital media asset for which the digital media frame 321 was generated). Thus, in such an embodiment, the DMDI 300 provides digital media curator 305 with an incentive to identify and curate a marketable collection of digital media frames 321. In some embodiments, one or more digital media frames 321 provided to a digital media curator 305 to be integrated into a web gallery 322 associated with the digital media curator 305 are autonomously selected by a curation algorithm. In some embodiments, a curation algorithm uses data or metadata associated with digital media frames 321 to create a marketable collection of digital media frames 321. In some embodiments, a curation algorithm is a machine learning algorithm. In some embodiments, a curation algorithm is provided to a digital media curator 305 by the DMDI 300.

FIG. 4 depicts a diagram of a network of web galleries facilitated by a digital media distribution infrastructure. As mentioned above, in some embodiments, through the use of a digital media distribution infrastructure (DMDI) 400, any digital territory (e.g., a website, web application, or mobile application) can be turned into a web gallery, providing the proprietor of the digital territory (e.g., a digital media producer or a digital media curator) with a digital storefront and a digital warehouse for commercializing digital media assets. In some embodiments, as depicted by FIG. 4, the DMDI 400 can support an unlimited number of web galleries 422 (e.g., web galleries 422A-422N), and any digital media consumer 403 can access any web gallery 422. In some embodiments, each web gallery 422 supported by the DMDI 400 may be accessed through a different digital territory, and there is no single digital territory through which all of the digital media assets received by the DMDI 400 may be accessed. As depicted by FIG. 4, the result is a decentralized infrastructure for the distribution of digital media assets, wherein a digital media producer is able to commercialize their art without sacrificing ownership and agency. Similarly, by providing digital media curators with the ability to create and curate an unlimited number of web galleries 422, the DMDI 400 can establish a marketplace for digital media assets that can serve any niche of digital art.

FIGS. 5A and 5B illustrate an exemplary embodiment of a web gallery. As mentioned above, a web gallery is a software system into which a digital media frame has been integrated. In some embodiments, the relationship between a digital media asset, a digital media frame, and a web gallery is analogous to that of a painting, a picture frame, and a real-world art gallery. Similar to the ways in which an artist can create a painting, the painting can be fixed into a picture frame for display, and an art gallery can hang the framed painting on a wall within the art gallery for consumption by patrons, a digital media producer can create a digital media asset, the digital media distribution infrastructure (DMDI) can generate a digital media frame for the digital media asset, and the digital media frame generated for the digital media asset can be displayed within the graphical user interface (GUI) of a web gallery for consumption by digital media consumers. In some embodiments, a web gallery may be any type or form of internet-enabled software system with a GUI within which a digital media frame (e.g., the widget of the digital media frame) can be displayed. For example, in some embodiments, a web gallery may be a website, a web application, a mobile application, or an Internet of Things (IoT) device.

In the example illustrated by FIG. 5A, Web Gallery #1 (i.e., web gallery 522) is a website into which a digital media frame 521 (e.g., digital media frame 521A) has been integrated (e.g., by a digital media curator, as described above). In some embodiments, as illustrated in FIG. 5, a plurality of digital media frames 521 may be integrated into a single web gallery 522. For example, in the example illustrated by FIG. 5, four digital media frames 521 have been integrated into web gallery 522, digital media frames 521A-521D. In this example, the digital media assets for which the four digital media frames 521 that have been integrated into web gallery 522 were generated are all video files. In some embodiments, an individual digital media frame 521 (e.g., the widget of the digital media frame 521) may be displayed within the GUI of a web gallery 522 in different forms or modes. For example, in some embodiments, an individual digital media frame 521 may have an expanded form and a collapsed form. In some embodiments, an expanded form of a digital media frame 521 displays or provides access to more functions of the digital media frame 521 than a collapsed form of the digital media frame 521. For example, in some embodiments, the expanded form of a digital media frame 521 displays a preview (as described above) of the digital media asset for which the digital media frame 521 was generated, while the collapsed form of the digital media frame 521 does not display a preview of the digital media asset. In some embodiments, an expanded form of a digital media frame 521 displays more information regarding the digital media asset for which the digital media frame 521 was generated than a collapsed form of the digital media frame 521. For example, as illustrated in FIG. 5A, digital media frame 521A (e.g., the widget of digital media frame 521A) is displayed within the GUI of web gallery 522 in an expanded form, while digital media frames 521B-521D (e.g., the widgets of digital media frames 521B-521D) are displayed within the GUI of the web gallery 522 in a collapsed form. In this example, the expanded form of digital media frame 521A displays the title of the digital media asset for which digital media frame 521A was generated, "DMA 1," a written description of DMA 1, four tags 523 associated with DMA 1, and the media credit value 543 established for DMA 1; while the collapsed forms of digital media frames 521B-521D display only the titles of, and the media credit values established for, the digital media assets for which digital media frames 521B-521D were generated.

In the example illustrated by FIG. 5A, all of the digital media frames 521 (e.g., the widgets of the digital media frames 521) integrated into web gallery 522 are displayed within the GUI of web gallery 522 in a locked state (as described above), as represented by the lock icon. For example, as illustrated in FIG. 5A, while digital media frame 521A is in a locked state, the video file for which digital media frame 521A was generated cannot be played through digital media frame 521A (e.g., the widget of frame 521A). As such, the digital media assets for which digital media frames 521A-521D were generated cannot be accessed by a digital media consumer through digital media frames 521A-521D until the digital media consumer selects one of the digital media frames 521 and the DMDI successfully deducts an amount of media credits equal to the media credit value 543 established for the digital media asset for which the digital media frame 521 was generated from a media credit account associated with the digital media consumer. As mentioned above, in response to detecting the selection of the digital media frame 521 and successfully deducting the media credit value 543 from the media credit account associated with the digital media consumer, the DMDI would then provide the digital media consumer with access to the digital media asset for which the digital media frame 521 was generated by unlocking the digital media frame 521. For example, in the example illustrated by FIG. 5B, a digital media consumer has selected digital media frame 521A, and the DMDI has successfully deducted the media credit value 543 established for the digital media asset for which digital media frame 521A was generated from a media credit account associated with the digital media consumer. In response, digital media frame 521A has now been unlocked. In this example, as illustrated in FIG. 5B, now that digital media frame 521A has been unlocked, the digital media consumer can access all of the features and functions of digital media frame 521A. In this example, the digital media consumer can now stream the video file for which digital media frame 521A was generated by selecting the play button within the widget of digital media frame 521A. However, as illustrated in FIG. 5B, because the digital media consumer has not yet selected any of digital media frames 521B-521D, and because the DMDI has not yet successfully deducted the media credit value 543 established for the digital media assets for which digital media frames 521B-521D were generated from the media credit account associated with the digital media consumer, digital media frames 521B-521D remained locked.

For example, in one application of the present invention, a dance team choreographs, performs, and records a new dance. The dance team would like to sell the recording of the new dance on the dance team's website. To do so, the dance team digitally submits the recording of the new dance to the digital media distribution infrastructure (DMDI), which establishes a media credit value for the recording of the new dance, generates a digital media frame (e.g., an API) for the recording of the new dance, and provides the digital media frame to the dance team. In this example, the media credit value established for the recording is five media credits. The dance team then integrates the digital media frame into the dance team's website. Then, a fan of the dance team, who has a media credit account provided by the DMDI that contains ten media credits, navigates to the dance team's website (e.g., through a standard web browser) and selects the digital media frame generated for the recording of the dance team's new dance, which is initially presented within the GUI of the dance team's website in a locked state. Through the digital media frame, the DMDI identifies the media credit account associated with the fan of the dance team and deducts the media credit value established for the recording of the dance team's new dance (i.e., five media credits) from the media credit account associated with the fan of the dance team. In response to successfully deducting the media credit value established for the recording of the dance team's new dance from the media credit account associated with the fan of the dance team, the DMDI unlocks the digital media frame and provides the fan of the dance team with access to the recording of the dance team's new dance (e.g., by allowing the fan of the dance team to download the recording of the dance team's new dance or stream the recording the dance team's new dance through the GUI of the dance team's website). The DMDI then adds a portion (e.g., three credits) of the five media credits deducted from the media credit account associated with the fan of the dance team to a media credit account associated with the dance team.

Later, in another example, a musician composes and records a new song and would like to sell the recording of the new song on the musician's website. To do so, the musician digitally submits the recording of the new song to the DMDI, which establishes a media credit value for the recording of the new song, generates a digital media frame (e.g., an API) for the recording of the new song, and provides the digital media frame to the musician. In this example, the media credit value established for the recording of the new song is five media credits. The musician then integrates the digital media frame into the musician's website. Then, the fan of the dance team, who is also a fan of the musician, navigates to the musician's website (e.g., through a standard web browser) and selects the digital media frame generated for the recording of the new song, which is initially presented within the GUI of the musician's website in a locked state. Through the digital media frame, the DMDI again identifies the media credit account associated with the fan (which now contains five media credits) and deducts the media credit value established for the recording of the new song (i.e., five media credits) from the media credit account associated with the fan. In response to successfully deducting the media credit value established for the recording of the new song from the media credit account associated with the fan, the DMDI unlocks the digital media frame and provides the fan with access to the recording of the new song (e.g., by allowing the fan to download the recording of the new song or stream the recording of the new song through the GUI of the musician's website). The DMDI then adds a portion (e.g., three credits) of the five media credits deducted from the media credit account associated with the fan to a media credit account associated with the musician. In this example, the fan, whose media credit account now contains zero credits, will not be able unlock any other digital media frame that has been generated by the DMDI for a digital media asset for which a media credit value greater than zero has been established, until the fan acquires more media credits from the DMDI.

Later, in another example, the fan of the dance team and the musician from the previous two examples accesses the two digital media frames generated by the DMDI for the recording of the dance team's new dance and the recording of the musician's new song and integrates the two digital media frames into the fan's own website. By integrating a digital media frame into the fan's website, the fan becomes a digital media curator. The fan then shares their website with a friend, who selects the digital media frame generated for the recording of the dance team's new dance, which is initially presented within the GUI of the fan's website in a locked state. Through the digital media frame generated for the recording of the dance team's new dance, the DMDI identifies a media credit account associated with the fan's friend (which, in this example, contains twelve media credits) and deducts the media credit value established for the dance team's new song (i.e., five media credits) from the media credit account associated with the fan's friend. In response to deducting the media credit value established for the recording of the dance team's new dance from the media credit account associated with the fan's friend, the DMDI unlocks the digital media frame generated for the recording of the dance team's new dance and provides the fan's friend with access to the recording of the dance team's new dance. The DMDI then adds a first portion (e.g., three credits) of the five media credits deducted from the media credit account associated with the fan's friend to the media credit account associated with the dance team, and, because the digital media frame generated for the recording of the dance team's new dance was accessed through the fan's website, the DMDI also adds a second portion (e.g., one credit) of the five media credits deducted from the media credit account associated with the fan's friend to the media credit account associated with the fan.

Media Credit Accounts and Media Credit Portals

In some embodiments, as illustrated in FIGS. 5A and 5B, if there are not enough media credits in a media credit account associated with a digital media consumer to unlock a digital media frame 521 (e.g., the digital media frame 521 was generated for a digital media asset for which a media credit value 543 was established that is greater than the amount of media credits in the media credit account associated with the digital media consumer), or if the digital media consumer otherwise wishes to add media credits to the media credit account associated with the digital media consumer, the digital media consumer can access a media credit portal (as described below) by selecting a media credits button 544 (e.g., a link to the media credit portal) displayed within the GUI of a web gallery. In some embodiments, a digital media consumer can access a media credit portal by selecting a digital media frame 521. For example, in some embodiments, if a digital media consumer selects a digital media frame 521, and the DMDI is unable to successfully deduct an amount of media credits equal to the media credit value 543 established for a digital media asset for which the digital media frame 521 was generated (e.g., the media credit value established for the digital media asset is greater than the amount of media credits in the media credit account associated with the digital media consumer, or if there is not yet a media credit account associated with the digital media consumer), the digital media consumer will be automatically directed to a media credit portal.

In some embodiments, a media credit account is an account associated with a digital media consumer, a digital media producer, or a digital media curator into or from which media credits provided by a digital media distribution infrastructure (DMDI) can be dynamically added or deducted. In some embodiments, a media credit is a unit of a digital coin or token that can be used to unlock a digital media frame (as described above), or to otherwise engage in services provided by the DMDI. In some embodiments, a media credit is a cryptocurrency (e.g., a crypto coin or a crypto token) facilitated by a blockchain system. In some embodiments, as mentioned above, to access a digital media asset through a digital media frame, a digital media consumer must be associated with a media credit account that includes an amount of media credits equal to or greater than a media credit value established for the digital media asset. In some embodiments, a digital media consumer can create or manage a media credit account by accessing a media credit portal provided by the DMDI. For example, in some embodiments, to create a profile with the DMDI, a digital media consumer registers with the DMDI, such as by accessing a website, web application, or mobile application (e.g., a media portal or a media credit portal, as described below) provided by the DMDI and completing a sign up process. In some embodiments, once the digital media consumer has created a profile with the DMDI, the DMDI creates a media credit account associated with the digital media consumer. Likewise, in some embodiments, to create a profile with the DMDI, a digital media producer registers with the DMDI, such as by accessing a website, web application, or mobile application provided by the DMDI and completing a sign up process. In some embodiments, once the digital media producer has created a profile with the DMDI, the DMDI creates a media credit account associated with the digital media producer. Similarly, in some embodiments, to create a profile with the DMDI, a digital media curator registers with the DMDI, such as by accessing a website, web application, or mobile application provided by the DMDI and completing a sign up process. In some embodiments, once the digital media curator has created a profile with the DMDI, the DMDI creates a media credit account associated with the digital media curator. In some embodiments, a user of the DMDI may be two or more of a digital media consumer, a digital media producer, and a digital media curator, and have only a single media credit account associated with the user. In some embodiments, a digital media consumer may use the media credit account associated with the digital media consumer to unlock a plurality of digital media frames integrated into a respective plurality of web galleries, as described above. In such an embodiment, the media credit account associated with the digital media consumer may be considered a "floating" media credit account, because the media credit account is not bound to a single web gallery.

FIG. 6 illustrates an exemplary embodiment of a media credit portal. In some embodiments, as illustrated by FIG. 6, a media credit portal 645 is a website or a web application that includes a graphical user interface (GUI). In some embodiments, as illustrated in FIG. 6, the GUI of the media credit portal 645 includes a media credit account 642, media credit acquisition options 647, and a suggested media section 624. In some embodiments, as illustrated in FIG. 6, the media credit portal 645 includes a DMDI brand image 646A or a web gallery brand image 646B, as described below. In the example illustrated by FIG. 6, a user of the DMDI (e.g., a digital media consumer) who has accessed the media credit portal 645 is associated with a media credit account 642 that contains 50 media credits. In this example, the media credit portal 645 displays three media credit acquisition options 647A-647C. In some embodiments, to add media credits to a media credit account 642 associated with a user of the DMDI, the user selects a media credit acquisition option 647, and the DMDI adds an amount of media credits equal to that of the media credit option 647 to the media credit account 642 associated with the user. For example, if the user associated with the media credit account 642 illustrated in FIG. 6 selects media credit acquisition option 647A, the DMDI will add 10 media credits to the media credit account 642 associated with the user, bringing the total amount of media credits in the media credit account 642 associated with the user to 60 credits. In some embodiments, media credits must be purchased from the DMDI in exchange for an appropriate amount of a real world currency (e.g., a fiat currency). For example, in some embodiments, to add media credits to a media credit account 642 associated with a user of the DMDI, the user must select a media credit acquisition option 647 and then exchange (e.g., via a credit or debit transaction) an amount of a real world currency equal to the value of the media credit acquisition option 647, as determined by the DMDI. In some embodiments, media credits provided by the DMDI are pegged to the value of a fiat currency. For example, the DMDI may determine that a single media credit is worth one US dollar (USD), such that the value of media credit acquisition option 647A, which is for 10 media credits, would be 10 USD. Or, for example, the DMDI may apply a scaling discount to larger media credit acquisition options. For example, the DMDI may determine that the value of media credit acquisition option 647A (e.g., for 10 media credits) is 10 USD (i.e., 1.0 USD per media credit), the value of media credit acquisition option 647B (e.g., for 20 media credits) is 18 USD (i.e., 0.9 USD per media credit), and the value of media credit acquisition option 647C (e.g., for 50 media credits) is 40 USD (i.e., 0.8 USD per media credit). However, the DMDI may determine the value of a media credit acquisition option 647 in any other way.

In some embodiments, a digital media consumer can access a media credit portal 645 directly, such as by navigating to a website on which the media credit portal 645 is hosted or by opening the media credit portal 645 within a mobile application. In some embodiments, as mentioned above, a digital media consumer can be directed to a media credit portal 645 from a web gallery. For example, in some embodiments, if a digital media consumer accesses a web gallery website and selects, from within the GUI of the web gallery website, a digital media frame generated for a digital media asset for which the established media credit value is greater than the amount of media credits contained within the media credit account associated with the digital media consumer, the digital media frame will function as a weblink to a media credit portal 645 website, through which the digital media consumer can acquire any necessary or desired media credits. However, a digital media consumer can be directed to a media credit portal 645 in any other way. For example, in the example illustrated by FIG. 6, a digital media consumer has been directed to the media credit portal 645 from web gallery #1 (as illustrated in FIGS. 5A and 5B). In some embodiments, as illustrated in FIG. 6, when a digital media consumer is directed to a media credit portal 645 from a web gallery, the media credit portal 645 displays a brand image 646B associated with the web gallery within the GUI of the media credit portal 645. In some embodiments, as illustrated in FIG. 6, a media credit portal 645 includes a suggested media section 624, wherein the media credit portal 645 displays one or more digital media frames 621 (e.g., digital media frames 621A-621C) generated for digital media assets that the DMDI has suggested for the digital media consumer that has accessed the media credit portal 645. In some embodiments, the DMDI suggests digital media assets for a digital media consumer based on the history of digital media assets previously accessed by the digital media consumer through digital media frames generated by the DMDI. In some embodiments, the DMDI suggests digital media assets for a digital media consumer based on one or more digital media frames integrated into a web gallery from which the digital media consumer was directed to the media credit portal 645. In some embodiments, the DMDI suggests digital media assets for a digital media consumer based on a digital media frame selected by the digital media consumer that directed the digital media consumer to the media credit portal 645. However, the DMDI may suggest digital media assets for a digital media consumer in any other way.

Digital Media Portal

In some embodiments, the digital media distribution infrastructure (DMDI) provides a digital media portal through which a digital media consumer can manage their profile created with the DMDI (e.g., by employing the media portal module 160, as depicted in FIG. 1). FIGS. 7A and 7B illustrate an exemplary embodiment of a digital media portal provided by the DMDI. In some embodiments, a digital media portal 761 is a website, a web application, or a mobile application. In some embodiments, as illustrated in FIG. 7A, a digital media portal 761 includes an unlocked media section 762 wherein the digital media portal 761 displays a list of the digital media assets 702 that the digital media consumer that has accessed the digital media portal 761 has accessed through digital media frames generated by the DMDI. In some embodiments, a digital media consumer can access a digital media asset 702 that the digital media consumer has previously accessed through a digital media frame generated by the DMDI by selecting the digital media asset 702 from within the list of digital media assets displayed within the unlocked media section 762 of the digital media portal 761. In some embodiments, as illustrated in FIG. 7A, a digital media portal 761 includes a suggested media section 724 wherein the digital media portal 761 displays one or more digital media frames 721 generated for digital media assets that the DMDI has suggested for the digital media consumer that has accessed the digital media portal 761, as described above. In some embodiments, as illustrated in FIG. 7A, a digital media portal 761 displays the media credit account 742 associated with the digital media consumer that has accessed the digital media portal 761 and a link 744 to a media credit portal (as described above). In some embodiments, if a digital media consumer selects the link 744 to a media credit portal from within the GUI of the digital media portal 761, the digital media portal 761 will display a media credit portal 745 within the GUI of the digital media portal 761, as illustrated in FIG. 7B.

Digital Media Distribution Infrastructure in the Metaverse

As described above, in various embodiments, a digital media distribution infrastructure (DMDI) provides digital media producers with a digital warehouse and a digital storefront for commercially distributing their digital media assets. As described above, in various embodiments, the DMDI is capable of receiving a digital media asset from a digital media producer and generating a digital media frame for the digital media asset. As described above, in various embodiments, a digital media frame generated by the DMDI can be integrated into any uniquely addressable digital territory (e.g., a website or a mobile application) to create a web gallery, and the digital media asset for which the digital media frame was generated can be accessed on or through the web gallery via the digital media frame (e.g., in exchange for one or more media credits, as described above).

Similarly, in some embodiments, a digital media frame generated for a digital media asset by the DMDI may be integrated into any uniquely addressable artificial or virtual environment within a metaverse. A metaverse is a collection of artificial or virtual environments. Different metaverses may take on different embodiments. For example, in some embodiments of a metaverse, the collection of artificial or virtual environments included in the metaverse make up one continuous virtual world (e.g., a collection of digital properties that make up a replica of a real world city) that is provided by a single digital entity. Or for example, in some embodiments of a metaverse, the artificial or virtual environments included in the metaverse are provided by different digital entities and make up a discontinuous virtual world.

FIG. 8 depicts an exemplary embodiment of a digital media distribution infrastructure (DMDI) implemented within a metaverse. An artificial or virtual environment into which a digital media frame generated by the DMDI has been integrated is referred to hereinafter as a "meta gallery" 822. For example, in the example depicted by FIG. 8, digital media frames generated by the DMDI 800 have been integrated into five different artificial or virtual environments included in the metaverse 870, creating five respective meta galleries 822A-822E. In some embodiments, similar to a digital media frame integrated into a web gallery (as described above), a digital media frame integrated into a meta gallery 822 includes or is otherwise paired with an artificial or virtual user interface element that is presented within the artificial or virtual environment of the meta gallery 822. In some embodiments, similar to a digital media frame integrated into a web gallery, a digital media frame integrated a meta gallery 822 (e.g., the artificial or virtual user interface element associated with the digital media frame) is initially presented within the meta gallery 822 in a locked state, wherein the digital media asset for which the digital media frame was generated cannot be accessed within the artificial or virtual environment of the meta gallery 822 until the digital media frame is unlocked (e.g., in exchange for one or more media credits, as described above).

For example, in one embodiment, a virtual environment provided by a digital entity within a metaverse 870 is a virtual apparel store that designs virtual clothes for virtual avatars. In this example, to commercialize their virtual clothing designs, the proprietor (e.g., a digital media producer) of the virtual apparel store employs the DMDI 800 by providing their virtual clothing designs (e.g., digital media assets) to the DMDI 800 and establishing media credit values for the virtual clothing designs. The DMDI 800 then generates, for the virtual clothing designs, digital media frames that can be integrated into the virtual apparel store to create a meta gallery 822. In this example, if a visitor to the virtual apparel store selects a digital media frame that has been generated for one of the virtual clothing designs (e.g., a pair of virtual sneakers) and integrated the virtual apparel store, the DMDI 800 will attempt to deduct the media credit value established for the virtual clothing design from a media credit account (as described above) associated with the visitor (e.g., a digital media consumer). If the DMDI 800 is able to successfully deduct the media credit value established for the virtual clothing design from a media credit account associated with the visitor, the DMDI 800 will provide the virtual clothing design to the visitor to be applied to a virtual avatar associated with the visitor.

Digital Media Content Prioritization System

As mentioned above, in various embodiments, disclosed herein are methods and systems for prioritizing, or managing the prioritization of, digital media content pieces within a digital media content gallery. FIG. 9 depicts an exemplary embodiment of a digital media content prioritization system (which may be included in a digital media distribution infrastructure (DMDI), as described above, such as within a search and discovery module of the DMDI). In some embodiments, as depicted in FIG. 9, a digital media content prioritization system (CPS) 900 is integrated into, or otherwise accesses a digital media content gallery 922 (hereinafter, "content gallery") that includes a plurality of digital media content pieces 902 (hereinafter, "content pieces"). In some embodiments, the content gallery 922 is managed or provided by a system that also provides the CPS 900 (e.g., the content gallery 922 and the CPS 900 are both provided by a DMDI, as described above). In some embodiments, the content gallery 922 is provided independently of the CPS 900 (e.g., the CPS 900 is provided by a DMDI, as described above, and the content gallery 922 is a platform independent of the DMDI, like YouTube or Spotify). In some embodiments, as depicted in FIG. 9, the content gallery 922 is visited by one or more users 903 (e.g., users 903A-903E), and the CPS 900 can assign a respective voter score 981 (e.g., voter scores 981A-981E) to each of the one or more users 903. For example, in some embodiments, a user 903 must create an account through the content galley 922 before the user 903 can access a content piece 902 provided by the content gallery 922, and the CPS 900 can associate a voter score 981 with the account created by and associated with the user 903 through the content gallery 922. Or for example, in some embodiments, if the content gallery 922 is provided by or otherwise managed by a DMDI, a user 903 must create an account through the DMDI before the user 903 can access a content piece 902 provided to the content gallery 922 by the DMDI (as described above), and the CPS 900 can associate a voter score 981 with the account created by and associated with the user through the DMDI.

In some embodiments, a voter score 981 is a numerical representation of a user's ability to influence a content score (as described below) associated with a content piece 902. In some embodiments, a voter score 981 is limited to a predetermined range (e.g., between 0 and 100). In some embodiments, a voter score 981 is not limited to a predetermined range. In some embodiments, a voter score 981 associated with a user 903 of a content gallery 922 is weighted relative to voter scores 981 associated with other users 903 of the content gallery 922. However, a voter score 981 associated with a user 903 of a content gallery 922 may be represented in any other appropriate way. In some embodiments, a voter score 981 associated with a user 903 of a content gallery 922 is determined based at least in part on positive votes or negative votes made by the user 903 on one or more content pieces 902 provided by the content gallery 922, as described in further detail below. For example, in some embodiments, a voter score 981 associated with a user 903 of a content gallery 922 is determined based at least in part on positive votes or negative votes made by the user 903 on one or more central pieces (e.g., content pieces 903 of particular importance to the content gallery 922, as described below). In some embodiments, a voter score 981 associated with a user 903 of a content gallery 922 begins by default at a median value (e.g., 50 out of 100) and can be dynamically increased or decreased. In some embodiments, a voter score 981 associated with a user 903 of a content gallery 922 begins by default at a maximum value (e.g., 100 out of 100) and can only be decreased. However, a voter score 981 associated with a user 903 of a content gallery 922 may be determined in any other appropriate way. In some embodiments, a voter score 981 associated with a user 903 of a content gallery 922 is not made viewable to the user 903.

FIG. 10 illustrates an exemplary embodiment of a content gallery employing a digital media content prioritization system (CPS). As illustrated in FIG. 10, content gallery 1022 (i.e., Web Gallery #2) provides visitors with access to a plurality of content pieces 1002 (e.g., content pieces 1002A-1002n). As illustrated in FIG. 10, each content piece 1002 provided by the content gallery 1022 is associated with a respective content score 1082 (e.g., content scores 1082A-1082n), which may or may not be displayed within the graphical user interface of the content gallery 1022. In the example illustrated in FIG. 10, upon navigating to the homepage of content gallery 1022, the graphical user interface of content gallery 1022 displays a group of featured content pieces (e.g., Featured Media section 1024). A group of featured content pieces may be selected by a content gallery 1022, or a curator of a content gallery, using any appropriate criteria (e.g., title, artist, producer, genre, tag, etc.). In the example illustrated in FIG. 10, the group of featured content pieces is simply a collection of the content pieces 1002 provided by the content gallery 1022 with the highest content scores 1082. As illustrated in FIG. 10, in some embodiments, when two or more content pieces 1002 provided by a content gallery 1022 are displayed as a group within a graphical user interface of the content gallery 1022, the two or more content pieces 1002 are prioritized within the group in descending order of content score 1082. For example, in the example illustrated in FIG. 10, the content pieces 1002 listed within the Featured Media section 1024 are listed in descending order of content score 1082. In some embodiments, when two or more content pieces 1002 provided by a content gallery 1022 are displayed as a group within a graphical user interface of the content gallery 1022, the CPS or the content gallery 1022 prioritizes a content piece 1002 from the group (e.g., the content piece 1002 from the group of content pieces with the highest content score 1082) by emphasizing a visual characteristic of the content piece 1002 (e.g., enlarging a thumbnail displayed for the content piece 1002, emboldening the title of the content piece 1002, etc.).

In some embodiments, a content score 1082 associated with a content piece 1002 provided by a content gallery 1022 is a numerical representation of how satisfied that users of the content gallery 1022 that have accessed or consumed the content piece 1002 have been with the experience. For example, in some embodiments, after accessing a content piece 1002 provided by a content gallery 1022, a user of the content gallery 1022 can make or submit a positive vote or a negative vote on the content piece 1002 (e.g., by selecting a thumbs up button or a thumbs down button, respectively, as illustrated in FIGS. 11A-11C). In response to detecting a positive vote made by a user on a content piece 1002 provided by a content gallery 1002 employing the CPS, the CPS can increase the content score 1082 associated with the content piece 1002. In response to detecting a negative vote made by a user on a content piece 1002 provided by a content gallery 1022 employing the CPS, the CPS can decrease the content score 1082 associated with the content piece 1002. In some embodiments, as described above, a user of a content gallery 1022 is associated with a voter score. In some such embodiments, when a user makes a positive or negative vote on a content piece 1002 provided by a content gallery 1022 employing the CPS, the magnitude of the change (e.g., the increase or decrease) made by the CPS to the content score 1082 associated with the content piece 1002 is determined based at least in part on the voter score associated with the user. For example, in some embodiments, the higher the voter score associated with a user, the greater the magnitude of the change made by the CPS to a content score 1082 associated with a content piece 1002 on which the user makes a positive or negative vote will be. For example, in such an embodiment, a positive vote made on a content piece 1002 by user 903A (who is associated with a voter score 981A of 3 out of 3 stars, as depicted in FIG. 9) would result in a greater increase to the content score 1082 associated with the content piece 1002 than a positive vote made on the content piece 1002 by user 90313 (who is associated with a voter score 9818 of 2 out of 3 stars, as depicted in FIG. 9). Or for example, similarly, a negative vote made on a content piece 1002 by user 903D (who is associated with a voter score 981D of 1 out of 3 stars, as depicted in FIG. 9) would result in a smaller decrease to the content score 1082 associated with the content piece 1002 than a negative vote made on the content piece 1002 by user 903E (who is associated with a voter score 981E of 3 out of 3 stars, as depicted in FIG. 9). In some embodiments, a content score 1082 associated with a content piece 1002 provided by a content gallery 1022 begins by default at a median value (e.g., 50 out of 100) and can be dynamically increased or decreased (e.g., in response to positive or negative votes, respectively, made on the content piece 1002 by users of the content gallery 1022). In some embodiments, a content score 1082 associated with a content piece 1002 begins at a minimum value (e.g., 0 out of 100) and can only be increased. However, a content score 1082 associated with a content piece 1002 may be determined in any other appropriate way.

Central Pieces & Antagonistic Users

As mentioned above, in some embodiments, one or more content pieces 1002 provided by a content gallery 1022 can be designated or identified as content pieces of particular importance to the content gallery 1022 (hereinafter, "central pieces"). In some embodiments, a content piece 1002 provided by a content gallery 1022 is designated as a central piece by a curator of the content gallery 1022 (as described above). For example, a curator of a content gallery 1022 may select one or more content pieces provided by the content gallery 1022 that the curator considers representative or exemplary of the theme or genre of the content gallery 1022 to be central pieces of the content gallery 1022. For example, the curator of a content gallery 1022 that primarily provides users of the content gallery 1022 with access to comedic videos might select the three videos provided by the content gallery 1022 that the curator finds the funniest as central pieces of the content gallery 1022. Or for example, the curator of a content gallery 1022 that primarily provides users of the content gallery 1022 with access to classical music songs might select all of the songs composed by a particular classical music composer (e.g., Mozart) to be central pieces of the content gallery 1022. However, central pieces of a content gallery 1022 may be designated or identified in any other appropriate way. In the example illustrated in FIG. 10, content pieces 1002A and 1002D (i.e., digital media assets #1 and #4) have been designated as central pieces, denoted by the star in the top right corners of their respective thumbnails (which may or may not be made visible to users of the content gallery 1022).

As mentioned above, in some embodiments, a voter score associated with a user of a content gallery is determined based at least in part on positive or negative votes made by the user on one or more central pieces of the content gallery. For example, in some embodiments, when a user of a content gallery employing the CPS makes a positive vote on a central piece of the content gallery, the CPS increases the voter score associated with the user. Similarly, in some embodiments, when a user of a content gallery employing the CPS makes a negative vote on a central piece of the content gallery, the CPS decreases the voter score associated with the user. In some embodiments, when the voter score associated with a user of a content gallery employing the CPS falls to, or below, a threshold voter score (which may be set by default, or determined by a curator of the content gallery), such as in response to the user making one too many negative votes on central pieces of the content gallery, the CPS identifies the user as an antagonistic user of the content gallery. For example, in the example depicted in FIG. 9, the threshold voter score set by a curator of the content gallery 922 is 1 out of 3 stars. Thus, in this example, users 903C and 903D are identified as antagonistic users of the content gallery 922 by the CPS 900. A user of a content gallery identified as an antagonistic user may be treated by the CPS or the content gallery differently than a user of the content gallery not identified as an antagonistic user. For example, in some embodiments, all votes, positive or negative, made by an antagonistic user of a content gallery on content pieces provided by the content gallery are disregarded by the CPS. Or for example, in some embodiments, a positive vote made by an antagonistic user on a content piece results in a decrease to the content score associated with the content piece, and a negative vote made by an antagonistic user on a content piece results in an increase to the content score associated with the content piece (e.g., the votes made by the antagonistic user are inverted). Or for example, a comment made on a content piece by an antagonistic user of a content gallery may be hidden from other users of the content gallery (e.g., users that have not been identified as antagonistic users of the content gallery), as described below. In some embodiments, antagonistic users of a content gallery are only allowed to see comments made on content pieces provided by the content gallery by antagonistic users. However, the differential treatment of an antagonistic user by the CPS or the content gallery may be hidden from (or otherwise unbeknownst to) the antagonistic user, such that the antagonistic user may be able to continue using the content gallery without further detracting from the experience of other users of the content gallery (e.g., users that have not been identified as antagonistic users). In this way, the CPS can provide autonomous content and community moderation functionality to a content gallery.

As mentioned above, in some embodiments, when a user of a content gallery makes a negative vote on a central piece of the content gallery, the CPS decreases the voter score associated with the user, and, if the voter score associated with the user falls to, or below, a threshold voter score, the CPS identifies the user as an antagonistic user of the content gallery. Because central pieces of a content gallery are generally representative or exemplary of the theme or genre of the content gallery (as described above), a user that makes enough negative votes on central pieces of a content gallery to become identified as an antagonistic user has effectively proven themself to likely be an antagonist, detractor, or opponent of the theme or genre of the content gallery. By identifying antagonistic users of a content gallery, and limiting the abilities of those antagonistic users, the CPS can provide automated content and community monitoring functionality to the content gallery, and thereby help protect and ensure a positive experience for other users of the content gallery (e.g., users of the content gallery that have not been identified as antagonistic users). Furthermore, by providing autonomous content and community moderation functionality to a content gallery unbeknownst to both users of the content gallery identified as antagonistic users and users of the of the content gallery not identified as antagonistic users, the CPS also provides an uninterrupted experience for the antagonistic users to enjoy the content gallery however they see fit.

For example, a fictitious content gallery called "Safe Space" provides its users with a collection of content pieces thematically rooted in mental and emotional health and wellness for refugees of armed conflicts. In this example, a large group of Safe Space's users are refugees from one political side of a civil war in Country X. In this example, members of another political side of the civil war in Country X visit Safe Space and begin making negative votes on content pieces provided by Safe Space that are popular among the refugees of the civil war in Country X, thereby attempting to make Safe Space less safe or enjoyable for the refugees of the civil war in Country X. In this example, by employing the CPS, a curator of Safe Space can designate the content pieces popular among the refugees of the civil war in Country X as central pieces of Safe Space, and set a high threshold voter score, such that only one or two negative votes made by a user of Safe Space on the content pieces popular among the refugees of the civil war in Country X is enough to cause the voter score associated with the user to fall to or below the threshold voter score and prompt the CPS to identify the user as an antagonistic user of Safe Space. Once the CPS has identified the user as an antagonistic user of Safe Space, the CPS can disregard (or invert) subsequent votes made by the antagonistic user on content pieces provided by Safe Space (as described above), or hide comments made by the antagonistic user on content pieces provided by Safe Space (as described below), such that the antagonistic user is unable to further detract from the experience of other users of Safe Space (e.g., the refugees of the civil war in Country X).

FIGS. 11A-11C illustrate differential treatment of antagonistic users by a CPS employed by a content gallery. In the example illustrated in FIGS. 11A-11C, the graphical user interface of content gallery 1122 (i.e., Web Gallery #2) now displays a page or a screen specific to a particular content piece 1102 (i.e., Digital Media Asset #1, or "DMA 1") provided by the content gallery 1122 (e.g., a user of Web Gallery #2 has selected DMA 1 from the Featured Media section 1024 illustrated in FIG. 10). In this example, the page or screen specific to the particular content piece 1102 displays information regarding the content piece 1102 (e.g., a description of the content piece 1102, a content score 1182 associated with the content piece 1102, one or more tags 1183 associated with the content piece 1102, etc.), positive vote and negative vote buttons (e.g., thumbs up and thumbs down buttons) for the content piece 1102, and a Comments section associated with the content piece 1102, wherein users of the content gallery 1122 can submit comments 1184 (e.g., comments 1184A-1184D) regarding the content piece 1102. In the example illustrated in FIG. 11A, four comments 1184 regarding the content piece 1102 have been submitted by four respective users of the content gallery 1122. In this example, the user that submitted comment 1184C has been previously identified by the CPS as an antagonistic user (as described above). In this example, the CPS and the content gallery 1122 allow only antagonistic users of the content gallery 1122 to view comments submitted by antagonistic users of the content gallery 1122; thus, in this example, FIG. 11A illustrates the view of the page or screen specific to the content piece 1102 that the CPS and the content gallery 1122 would provide to an antagonistic user of the content gallery 1122. Similarly, in this example, FIGS. 11B and 11C illustrate the removal of the comment 1184C submitted by the antagonistic user and the view of the page or screen specific to the content piece 1102 that the CPS and the content gallery 1122 would provide to users of the content gallery 1122 that have not been identified by the CPS as antagonistic users of the content gallery 1122, respectively. In this way, potentially negative comments submitted by antagonistic users of a content gallery, which may be detrimental to the experience of users of the content gallery that are not antagonistic users, can be hidden from those users that are not antagonistic users, unbeknownst to the antagonistic users.

Tag Voting

In some embodiments, as mentioned above, a content piece provided by a content gallery that employs the CPS is associated with one or more tags. A tag may be any type of identifier or descriptor. For example, a comedic video provided by a content gallery may be associated with a "funny" tag, a "comedy" tag, or a "comedian" tag. In some embodiments, a tag associated with a content piece provided by a content gallery is determined or selected by a curator of the content gallery. For example, in some embodiments, a curator of a content gallery can assign any tag to a content piece provided by the content gallery that the curator deems appropriate. Or for example, in some embodiments, the CPS provides a curator of a content gallery that employs the CPS with a predetermined set of tags that the curator can select to assign to a content piece provided by the content gallery. In some embodiments, a tag is automatically determined for and assigned to a content piece by the CPS, such as through the use of machine learning algorithms or artificial intelligence (e.g., chatGPT). However, a tag may be determined for or assigned to a content piece in any other way.

In some embodiments, a tag associated with a content piece provided by a content gallery that employs the CPS is also associated with a tag score. In some embodiments, a tag score associated with a tag associated with a content piece provided by a content gallery is a numerical representation of how much users of the content gallery agree with the association of the tag with the content piece. For example, in some embodiments, as illustrated in FIG. 12, after accessing a content piece 1202 provided by a content gallery 1222, a user of the content gallery 1222 can make or submit a positive vote or a negative vote on a tag 1283 associated with the content piece 1202 (e.g., by selecting an up vote button or a down vote button, respectively, associated with the tag 1283). For example, in the example illustrated in FIG. 12, DMA 1 is associated with four tags 1283 (i.e., #Tag1, #Tag2, #Tag3, and #Tag4). By clicking on the arrow button to the right of the tags 1283 within the graphical user interface of the content gallery 1222, a user of the content gallery 1222 has prompted the content gallery 1222 to display information and interface elements associated with the tags 1283 (e.g., tag scores 1285 associated with the tags 1283, synonyms associated with the tags 1283, and up vote and down vote buttons associated with the tags 1283). In this example, #Tag1 has a tag score of 3 out of 3 stars (implying that users of the content gallery 1222 that have accessed the content piece 1202 generally agree strongly with the association of #Tag1 with the content piece 1202), #Tag3 and #Tag4 both have tag scores of 2 out of 3 stars (implying that users of the content gallery 1222 that have accessed the content piece 1202 generally agree somewhat with the associations of #Tag3 and #Tag4 with the content piece 1202), and #Tag2 has a tag score of 1 out of 3 stars (implying that users of the content gallery 1222 that have accessed the content piece 1202 generally disagree with the association of #Tag2 with the content piece 1202). In some embodiments, in response to detecting a positive vote or a negative vote made by a user of a content gallery 1222 that employs the CPS on a tag 1283 associated with a content piece 1202 provided by the content gallery 1222, the CPS can increase the tag score 1285 associated with the tag 1283. Similarly, in response to detecting a negative vote made by a user of the content gallery 1222 on a tag 1283 associated with a content piece 1202 provided by the content gallery 1222, the CPS can decrease the tag score 1285 associated with the tag 1283.

In some embodiments, the higher the voter score (as described above) associated with a user, the greater the magnitude of the change made by the CPS to a tag score 1285 associated with a tag 1283 on which the user makes a positive or negative vote will be. For example, in such an embodiment, a positive vote made on a tag 1283 associated with content piece 1202 (e.g., #Tag3) by user 903A (who is associated with a voter score 981A of 3 out of 3 stars, as depicted in FIG. 9) would result in a greater increase to the tag score 1285 associated with the tag 1283 than a positive vote made on the tag 1283 by user 90313 (who is associated with a voter score 9818 of 2 out of 3 stars, as depicted in FIG. 9). Or for example, similarly, a negative vote made on a tag 1283 associated with content piece 1202 (e.g., #Tag1) by user 903D (who is associated with a voter score 981D of 1 out of 3 stars, as depicted in FIG. 9) would result in a smaller decrease to the tag score 1285 associated with the tag 1283 than a negative vote made on the tag 1283 by user 903E (who is associated with a voter score 981E of 3 out of 3 stars, as depicted in FIG. 9). In some embodiments, a tag score 1285 associated with a tag 1283 associated with a content piece 1202 provided by a content gallery 1222 begins by default at a median value (e.g., 50 out of 100) and can be dynamically increased or decreased (e.g., in response to positive or negative votes, respectively, made on the tag 1283 by users of the content gallery 1222). In some embodiments, a tag score 1285 associated with a tag 1283 associated with a content piece 1202 begins at a maximum value (e.g., 100 out of 100) and can only be decreased. However, a tag score 1285 associated with a tag 1283 associated with a content piece 1202 may be determined in any other appropriate way. In some embodiments, all votes, positive or negative, made by an antagonistic user (as described above) of a content gallery on a tag associated with a content piece provided by the content gallery are disregarded by the CPS.

In some embodiments, a user of a content gallery can search through a plurality of content pieces provided by the content gallery using tags. For example, FIG. 13 illustrates an example of search results provided by a content gallery that employs the CPS in response to a tag search. In the example illustrated in FIG. 13, a user has submitted #Tag1 (or a synonym of #Tag1) as a search term into a search bar 1386 provided by the graphical user interface of content gallery 1322 (i.e., Web Gallery #2). In response to the user submitting the search term #Tag1 (or a synonym of #Tag1), the content gallery 1322 (or the CPS employed by the content gallery 1322) identifies every content piece 1302 provided by the content gallery 1322 and associated with #Tag1 and displays the content pieces 1302 associated with #Tag1 as a group within the graphical user interface of the content gallery 1322. For example, in the example illustrated in FIG. 13, the content gallery 1322 (or the CPS employed by the content gallery 1322) has identified five content pieces 1302 (e.g., content pieces 1302A-1302E) provided by the content gallery 1322 and associated with #Tag1, and now displays the five content pieces 1302 associated with #Tag1 as a group within the graphical user interface of the content gallery 1322. In some embodiments, as illustrated in FIG. 13, when a content gallery 1322 displays two or more content pieces 1302 provided by the content gallery 1322 and associated with the same tag (e.g., #Tag1) as a group within a graphical user interface of the content gallery 1322, the two or more content pieces 1302 are prioritized within the group in descending order of their respective tag scores 1385 (e.g., tag scores 1385A-1385E) associated with the tag. For example, in the example illustrated in FIG. 13, the five content pieces 1302 provided by the content gallery 1322 and associated with #Tag1 are listed within the Search Results section 1324 in descending order of tag score 1385. In some embodiments, when two or more content pieces 1302 provided by a content gallery 1322 and associated with the same tag (e.g., #Tag1) are displayed as a group within a graphical user interface of the content gallery 1322, the CPS or the content gallery 1322 prioritizes a content piece 1302 from the group (e.g., the content piece 1302 from the group of content pieces with the highest tag score 1385) by emphasizing a visual characteristic of the content piece 1302 (e.g., enlarging a thumbnail displayed for the content piece 1302, emboldening the title of the content piece 1302, etc.).

As a person skilled in the art will recognize from the previous detailed description and from the figures and claims, modifications and changes can be made to the embodiments of the invention without departing from the scope of this invention as disclosed here in the present application. It will be appreciated that, although the methods, processes, and functions of the present application have been recited in a particular series of steps, the individual steps of the methods, processes, and functions may be performed in any order, in any combination, or individually.

Embodiments are described at least in part herein with reference to flowchart illustrations and/or block diagrams of methods, systems, and computer program products and data structures according to embodiments of the disclosure. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

The aforementioned computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks. The computer program instructions may also be loaded onto a computer or other programmable data processing apparatus to cause a series of operational steps to be performed on the computer or other programmable apparatus, to produce a computer implemented process such that, the instructions which execute on the computer or other programmable apparatus provide steps for implementing the functions/acts specified in the block or blocks.

In general, the word "module" as used herein, refers to logic embodied in hardware or firmware, or to a collection of software instructions, written in a programming language, such as, Java, C, etc. One or more software instructions in the unit may be embedded in firmware. The modules described herein may be implemented as either software and/or hardware modules and may be stored in any type of non-transitory computer-readable medium or other non-transitory storage elements. Some non-limiting examples of non-transitory computer-readable media include CDs, DVDs, BLU-RAY, flash memory, and hard disk drives.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

What is claimed is:

1. A method for autonomously moderating a content gallery, the method comprising:

providing a content gallery comprising a plurality of content pieces to a plurality of users, wherein each content piece of the plurality of content pieces is associated with a respective content score and wherein each user of the plurality of users is associated with a respective voter score;

designating a first content piece of the plurality of content pieces as a central piece;

modifying a first voter score associated with a first user of the plurality of users based on at least one interaction between the first user and the first content piece, wherein the at least one interaction between the first user and the first content piece comprises a negative vote made by the first user on the first content piece; and based on the first voter score associated with the first user, moderating at least one interaction between the first user and a second content piece of the plurality of content pieces, wherein moderating the at least one interaction between the first user and the second content piece comprises inverting a vote made by the first user on the second content piece.

2. The method of claim 1, further comprising:

based on the first voter score associated with the first user, identifying the first user as an antagonistic user of the content gallery; and based on identifying the first user as an antagonistic user of the content gallery, moderating an interaction between the first user and a third content piece of the plurality of content pieces, wherein moderating the interaction between the first user and the third content piece comprises disregarding a negative vote made by the first user on the third content piece.

3. The method of claim 1, further comprising, based on the first voter score associated with the first user, moderating at least one interaction between the first user and a third content piece of the plurality of content pieces, wherein moderating the at least one interaction between the first user and the third content piece comprises downscaling a negative vote made by the first user on the third content piece.

4. The method of claim 1, wherein moderating the at least one interaction between the first user and the second content piece further comprises hiding a comment made by the first user on the second content piece.

5. The method of claim 1, further comprising designating at least two content pieces of the plurality of content pieces as central pieces.

6. The method of claim 1, further comprising:

based on the first voter score associated with the first user, identifying the first user as a first antagonistic user of the content gallery, wherein the at least one interaction between the first user and the second content piece further comprises a comment made by the first user on the second content piece, and wherein moderating the at least one interaction between the first user and the second content piece further comprises displaying the comment to a second user of the plurality of users identified as a second antagonistic user of the content gallery and hiding the comment from a third user of the plurality of users.

7. The method of claim 6, wherein the third user is not identified as an antagonistic user of the content gallery.

8. A system for autonomously moderating a content gallery, the system comprising a network component, at least one memory, and at least one processor operative to:

provide a content gallery comprising a plurality of content pieces to a plurality of users, wherein each content piece of the plurality of content pieces is associated with a respective content score and wherein each user of the plurality of users is associated with a respective voter score;

designate a first content piece of the plurality of content pieces as a central piece;

modify a first voter score associated with a first user of the plurality of users based on a negative vote made by the first user on the first content piece; and based on the first voter score associated with the first user, moderating at least one interaction between the first user and a second content piece of the plurality of content pieces, wherein moderating the at least one interaction between the first user and the second content piece comprises hiding a comment made by the first user on the second content piece.

9. The system of claim 8, wherein the at least one processor is further operative to, based on the first voter score associated with the first user, identify the first user as an antagonistic user of the content gallery, wherein moderating the at least one interaction between the first user and the second content piece further comprises disregarding a negative vote made by the first user on the second content piece.

10. The system of claim 8, wherein moderating the at least one interaction between the first user and the second content piece further comprises downscaling a negative vote made by the first user on the second content piece.

11. The system of claim 8, wherein moderating the at least one interaction between the first user and the second content piece further comprises inverting a negative vote made by the first user on the second content piece.

12. The system of claim 8, wherein the at least one processor is further operative to, based on the first voter score associated with the first user, identify the first user as a first antagonistic user of the content gallery, wherein moderating the at least one interaction between the first user and the second content piece further comprises displaying the comment to a second user of the plurality of users identified as a second antagonistic user of the content gallery and hiding the comment from a third user of the plurality of users.

13. The system of claim 12, wherein the third user is not identified as an antagonistic user of the content gallery.

14. The system of claim 12, wherein the at least one processor is operative to identify the first user as the first antagonistic user of the content gallery at least in part by comparing the first voter score to a threshold voter score.

15. A method for autonomously moderating a content gallery, the method comprising:

providing a content gallery comprising a plurality of content pieces to a plurality of users, wherein each content piece of the plurality of content pieces is associated with a respective content score and wherein each user of the plurality of users is associated with a respective voter score;

designating a first content piece of the plurality of content pieces as a central piece;

modifying a first voter score associated with a first user of the plurality of users based at least in part on a negative vote made by the first user on the first content piece; and based on the first voter score associated with the first user, moderating at least one interaction between the first user and a second content piece of the plurality of content pieces, wherein moderating the at least one interaction between the first user and the second content piece comprises hiding a comment made by the first user on a second content piece.

16. The method of claim 15, wherein moderating the at least one interaction between the first user and the second content piece further comprises disregarding a negative vote made by the first user on the second content piece.

17. The method of claim 15, wherein moderating the at least one interaction between the first user and the second content piece further comprises downscaling a negative vote made by the first user on the second content piece.

18. The method of claim 15, wherein moderating the at least one interaction between the first user and the second content piece further comprises inverting a negative vote made by the first user on the second content piece.

19. The method of claim 15, further comprising, based on the first voter score associated with the first user, identifying the first user as a first antagonistic user of the content gallery, wherein moderating the at least one interaction between the first user and the second content piece further comprises displaying the comment to a second user of the plurality of users identified as a second antagonistic user of the content gallery and hiding the comment from a third user of the plurality of users.

20. The method of claim 19, wherein the third user is not identified as an antagonistic user of the content gallery.

* * * * *